United States Patent
Suzuki et al.

(10) Patent No.: US 10,623,947 B2
(45) Date of Patent: Apr. 14, 2020

(54) TERMINAL APPARATUS, BASE STATION APPARATUS, COMMUNICATION METHOD, AND INTEGRATED CIRCUIT

(71) Applicant: SHARP KABUSHIKI KAISHA, Sakai, Osaka (JP)

(72) Inventors: Shoichi Suzuki, Sakai (JP); Tatsushi Aiba, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 4 days.

(21) Appl. No.: 16/090,215

(22) PCT Filed: Feb. 9, 2017

(86) PCT No.: PCT/JP2017/004734
§ 371 (c)(1),
(2) Date: Sep. 29, 2018

(87) PCT Pub. No.: WO2017/169160
PCT Pub. Date: Oct. 5, 2017

(65) Prior Publication Data
US 2019/0116491 A1 Apr. 18, 2019

(30) Foreign Application Priority Data
Mar. 30, 2016 (JP) .................. 2016-067455

(51) Int. Cl.
*H04W 8/22* (2009.01)
*H04J 11/00* (2006.01)
(Continued)

(52) U.S. Cl.
CPC ............... *H04W 8/22* (2013.01); *H04J 11/00* (2013.01); *H04L 5/0044* (2013.01);
(Continued)

(58) Field of Classification Search
CPC ....... H04W 8/22; H04W 72/04; H04W 76/11; H04W 76/27; H04W 28/0215;
(Continued)

(56) References Cited

U.S. PATENT DOCUMENTS

2016/0338049 A1* 11/2016 Takeda .................... H04L 5/001
2017/0272214 A1* 9/2017 Chen .................... H04L 5/1469
(Continued)

OTHER PUBLICATIONS

China Mobile Communications Corporation (CMCC), "Motivation for New Work Item Proposal: UL transmission Enhancement for LTE", R1-160226, CMCC, 3GPP TSG RAN Meeting #71, Gothenburg, Sweden, Mar. 7-10, 2016.
(Continued)

*Primary Examiner* — Walli Z Butt
(74) *Attorney, Agent, or Firm* — ScienBiziP, P.C.

(57) ABSTRACT

A terminal apparatus (1) and a base station apparatus (3) efficiently communicate with each other by using an uplink signal. The terminal apparatus (1) receives information for indicating a configuration of an added UpPTS, transmits an SRS and a PUSCH, and transmits capability information used for individually indicating (i) whether the terminal apparatus (3) supports the SRS transmission in the added UpPTS included in a special subframe, and (ii) whether the terminal apparatus (3) supports the PUSCH transmission in the added UpPTS included in the special subframe.

6 Claims, 19 Drawing Sheets

(51) Int. Cl.
*H04W 72/04* (2009.01)
*H04L 5/00* (2006.01)
*H04W 76/11* (2018.01)
*H04W 76/27* (2018.01)
*H04L 5/14* (2006.01)
*H04L 25/02* (2006.01)
*H04W 28/02* (2009.01)

(52) U.S. Cl.
CPC .......... *H04L 5/0051* (2013.01); *H04L 5/0092* (2013.01); *H04L 5/1469* (2013.01); *H04L 25/0226* (2013.01); *H04W 28/0215* (2013.01); *H04W 72/04* (2013.01); *H04W 72/042* (2013.01); *H04W 72/0446* (2013.01); *H04W 76/11* (2018.02); *H04W 76/27* (2018.02)

(58) Field of Classification Search
CPC . H04W 72/042; H04W 72/0446; H04J 11/00; H04L 5/0092; H04L 5/0044; H04L 5/0051; H04L 5/1469; H04L 25/0226
See application file for complete search history.

(56) References Cited

U.S. PATENT DOCUMENTS

2018/0213552 A1* 7/2018 Wei .................. H04L 5/0051
2018/0323917 A1* 11/2018 Um .................. H04L 5/0053
2018/0351713 A1* 12/2018 Wang ................ H04L 5/0048

OTHER PUBLICATIONS

3GPP TS 36.211 V12.5.0 (Mar. 2015), 3rd Generation Partnership Project; Technical Specification Group Radio Access Network; Evolved Universal Terrestrial Radio Access (E-UTRA); Physical channels and modulation (Release 12), Mar. 26, 2015.

3GPP TS 36.213 V12.5.0 (Mar. 2015), 3rd Generation Partnership Project; Technical Specification Group Radio Access Network; Evolved Universal Terrestrial Radio Access (E-UTRA); Physical layer procedures (Release 12), Mar. 26, 2015.

* cited by examiner

| UPLINK CYCLIC PREFIX CONFIGURATION (*UL-CyclicPrefixLength*) | CYCLIC PREFIX LENGTH $N_{CP,l}$ | SC-FDMA SYMBOL LENGTH |
|---|---|---|
| NORMAL CYCLIC PREFIX | 160 for $l = 0$<br>144 for $l = 1, 2, \cdots, 6$ | $(160+2048) \cdot T_s$ for $l = 0$<br>$(144+2048) \cdot T_s$ for $l = 1, 2, \cdots, 6$ |

FIG. 4

| UL/DL CONFIGURATION | DOWNLINK-TO-UPLINK SWITCH-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5ms | D | S | U | U | U | D | S | U | U | U |
| 1 | 5ms | D | S | U | U | D | D | S | U | U | D |
| 2 | 5ms | D | S | U | D | D | D | S | U | D | D |
| 3 | 10ms | D | S | U | U | U | D | D | D | D | D |
| 4 | 10ms | D | S | U | U | D | D | D | D | D | D |
| 5 | 10ms | D | S | U | D | D | D | D | D | D | D |
| 6 | 5ms | D | S | U | U | U | D | S | U | U | D |

FIG. 5

| SPECIAL SUBFRAME CONFIGURATION | DwPTS | UpPTS |
|---|---|---|
| 0 | $6592 \cdot T_s$ (3 symbol) | $(1+X) \cdot 2192 \cdot T_s$ (1+X symbol) |
| 1 | $19760 \cdot T_s$ (9 symbol) | |
| 2 | $21952 \cdot T_s$ (10 symbol) | |
| 3 | $24144 \cdot T_s$ (11 symbol) | |
| 4 | $26336 \cdot T_s$ (12 symbol) | |
| 5 | $6592 \cdot T_s$ (3 symbol) | $(2+X) \cdot 2192 \cdot T_s$ (2+X symbol) |
| 6 | $19760 \cdot T_s$ (9 symbol) | |
| 7 | $21952 \cdot T_s$ (10 symbol) | |
| 8 | $24144 \cdot T_s$ (11 symbol) | |
| 9 | $13168 \cdot T_s$ (6 symbol) | |

FIG. 8

| UL/DL CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

FIG. 10

| UL/DL CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 2 | | | | 4 | | | | | 4 | |
| | D | S | U | D | D | D | S | U | D | D |

PDCCH ⟶ PUSCH 1101

FIG. 11

| UL/DL CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | 6 | 6 | | | 4 | 6 | 6 | | | 4 |
| 2 | | 5 | | 4 | | | 5 | | 4 | |
| 3 | 4 | | | | | | | 4 | 4 | 4 |
| 4 | | | | | | | | 4 | 4 | 4 |
| 5 | | | | | | | | 4 | 4 | |
| 6 | 7 | 7 | | | | 7 | 7 | | | 5 |

FIG. 12

FIG. 17I CONTENTION BASED RANDOM ACCESS PROCEDURE

| SFN | 0 | | | | | | | | | | 1 | | | | | | | | | |
|---|---|---|---|---|---|---|---|---|---|---|---|---|---|---|---|---|---|---|---|---|
| SUBFRAME NUMBER | 0 | 1 | 2 | 3 | 4 | 5 | 6 | 7 | 8 | 9 | 0 | 1 | 2 | 3 | 4 | 5 | 6 | 7 | 8 | 9 |
| UL/DL CONFIGURATION 2 | D | S | U | D | D | D | S | U | D | D | D | S | U | D | D | D | S | U | D | D |
| Available subframe | | | Y | | | | | Y | | | | | Y | | | | | Y | | |

- 1700: PDCCH INCLUDING RA-RNTI, RANDOM ACCESS RESPONSE GRANT ASSOCIATED WITH CONTENTION BASED RANDOM ACCESS PROCEDURE (subframe n)
- 1701: First available subframe n+k, k≥6
- 1702: Next available subframe after first available subframe n+k, k≥6

FIG. 17II NON-CONTENTION BASED RANDOM ACCESS PROCEDURE

| SFN | 0 | | | | | | | | | | 1 | | | | | | | | | |
|---|---|---|---|---|---|---|---|---|---|---|---|---|---|---|---|---|---|---|---|---|
| SUBFRAME NUMBER | 0 | 1 | 2 | 3 | 4 | 5 | 6 | 7 | 8 | 9 | 0 | 1 | 2 | 3 | 4 | 5 | 6 | 7 | 8 | 9 |
| UL/DL CONFIGURATION 2 | D | S | U | D | D | D | S | U | D | D | D | S | U | D | D | D | S | U | D | D |
| Available subframe | | Y | Y | | | | Y | Y | | | | Y | Y | | | | Y | Y | | |

- 1703: PDCCH INCLUDING RA-RNTI, RANDOM ACCESS RESPONSE GRANT ASSOCIATED WITH NON-CONTENTION BASED RANDOM ACCESS PROCEDURE (subframe n)
- 1704: First available subframe n+k, k≥6
- 1705: Next available subframe after first available subframe n+k, k≥6

TERMINAL APPARATUS, BASE STATION APPARATUS, COMMUNICATION METHOD, AND INTEGRATED CIRCUIT

TECHNICAL FIELD

The present invention relates to a terminal apparatus, a base station apparatus, a communication method, and an integrated circuit.

BACKGROUND ART

In the 3rd Generation Partnership Project (3GPP), a radio access method and a radio network for a cellular mobile communication (hereinafter, referred to as "Long Term Evolution (LTE, registered trademark)", or "Evolved Universal Terrestrial Radio Access (EUTRA)") have been studied. In LTE, a base station apparatus is also referred to as an evolved NodeB (eNodeB), and a terminal apparatus is also referred to as a User Equipment (UE). LTE is a cellular communication system in which multiple areas covered by the corresponding base station apparatus are deployed to form a cellular structure. A single base station apparatus may manage multiple cells.

LTE supports a Time Division Duplex (TDD). LTE that employs the TDD scheme is also referred to as TD-LTE or LTE TDD. In TDD, uplink signals and downlink signals are time division multiplexed. Furthermore, LTE supports a Frequency Division Duplex (FDD).

In 3GPP, transmitting a PUSCH in UpPTS of a special subframe for enhancing uplink capacity has been studied (NPL 1).

CITATION LIST

Non Patent Literature

NPL 1: "Motivation for New Work Item Proposal: UL transmission Enhancement for LTE", R1-160226, CMCC, 3GPP TSG RAN Meeting #71, Gothenburg, Sweden, 7-10 Mar. 2016.
NPL 2: "3GPP TS 36.211 V12.5.0 (2015-03)", 26 Mar. 2015.
NPL 3: "3GPP TS 36.213 V12.5.0 (2015-03)", 26 Mar. 2015.

SUMMARY OF INVENTION

Technical Problem

The present invention provides a terminal apparatus capable of efficiently communicating with a base station apparatus by using an uplink signal, a base station apparatus communicating with the terminal apparatus, a communication method used for the terminal apparatus, a communication method used for the base station apparatus, an integrated circuit mounted on the terminal apparatus, and an integrated circuit mounted on the base station apparatus. Here, this uplink signal may include a PUSCH, an SRS, and/or a PRACH.

Solution to Problem (1) According to some aspects of the present invention, the following measures are provided. That is, a first aspect according to the present invention is a terminal apparatus that includes a receiver configured to receive information for indicating a configuration of an added Uplink Pilot Time Slot (UpPTS), and a transmitter configured to transmit a Sounding Reference Signal (SRS) and a Physical Uplink Shared CHannel (PUSCH), in which the transmitter transmits capability information used for individually indicating (i) whether the terminal apparatus supports the SRS transmission in the added UpPTS included in a special subframe, and (ii) whether the terminal apparatus supports the PUSCH transmission in the added UpPTS included in the special subframe.

(2) A second aspect according to the present invention is a base station apparatus that includes a transmitter configured to transmit information for indicating a configuration of an added Uplink Pilot Time Slot (UpPTS), and a receiver configured to receive a Sounding Reference Signal (SRS) and a Physical Uplink Shared CHannel (PUSCH), in which the receiver receives capability information used for individually indicating (i) whether a terminal apparatus supports the SRS transmission in the added UpPTS included in a special subframe, and (ii) whether the terminal apparatus supports the PUSCH transmission in the added UpPTS included in the special subframe.

(3) A third aspect according to the present invention is a communication method used for a terminal apparatus that receives information for indicating a configuration of an added Uplink Pilot Time Slot (UpPTS), transmits a Sounding Reference Signal (SRS) and a Physical Uplink Shared CHannel (PUSCH), and transmits capability information used for individually indicating (i) whether the terminal apparatus supports the SRS transmission in the added UpPTS included in a special subframe, and (ii) whether the terminal apparatus supports the PUSCH transmission in the added UpPTS included in the special subframe.

(4) A fourth aspect according to the present invention is a communication method used for a base station apparatus that transmits information for indicating a configuration of an added Uplink Pilot Time Slot (UpPTS), receives a Sounding Reference Signal (SRS) and a Physical Uplink Shared CHannel (PUSCH), and receives capability information used for individually indicating (i) whether a terminal apparatus supports the SRS transmission in the added UpPTS included in a special subframe, and (ii) whether the terminal apparatus supports the PUSCH transmission in the added UpPTS included in the special subframe.

(5) A fifth aspect according to the present invention is an integrated circuit mounted on a terminal apparatus that includes a reception circuit configured to receive information for indicating a configuration of an added Uplink Pilot Time Slot (UpPTS), and a transmission circuit configured to transmit a Sounding Reference Signal (SRS) and a Physical Uplink Shared CHannel (PUSCH), in which the transmission circuit transmits capability information used for individually indicating (i) whether the terminal apparatus supports the SRS transmission in the added UpPTS included in a special subframe, and (ii) whether the terminal apparatus supports the PUSCH transmission in the added UpPTS included in the special subframe.

(6) A sixth aspect according to the present invention is an integrated circuit mounted on a base station apparatus that includes a transmission circuit configured to transmit information for indicating a configuration of an added Uplink Pilot Time Slot (UpPTS), and a reception circuit configured to receive a Sounding Reference Signal (SRS) and a Physical Uplink Shared CHannel (PUSCH), in which the reception circuit receives capability information used for individually indicating (i) whether a terminal apparatus supports the SRS transmission in the added UpPTS included in a special subframe, and (ii) whether the terminal apparatus supports the PUSCH transmission in the added UpPTS included in the special subframe.

Advantageous Effects of Invention

According to the present invention, a terminal apparatus and a base station apparatus can efficiently communicate with each other by using an uplink signal.

BRIEF DESCRIPTION OF DRAWINGS

FIG. 4 is a diagram illustrating one example of an uplink cyclic prefix configuration, according to the present embodiment.

FIG. 5 is a diagram illustrating UL/DL configurations, according to the present embodiment.

FIG. 8 is a diagram illustrating one example of special subframe configurations for a normal cyclic prefix in a downlink, according to the present embodiment.

FIG. 10 is a diagram illustrating a first example of a relation between a subframe in which a PDCCH is detected and a subframe in which corresponding PUSCH transmission is adjusted, according to the present embodiment.

FIG. 11 is a diagram illustrating the first example of the relation between the subframe in which the PDCCH is detected and the subframe in which the corresponding PUSCH transmission is adjusted, according to the present embodiment.

FIG. 12 is a diagram illustrating a second example of the relation between a subframe in which a PDCCH is detected and a subframe in which corresponding PUSCH transmission is adjusted, according to the present embodiment.

FIGS. 17I and 17II are diagrams illustrating one example of a subframe available for PUSCH transmission corresponding to a random access response grant, according to the present embodiment.

DESCRIPTION OF EMBODIMENTS

Embodiments of the present invention will be described below.

Figure 1:
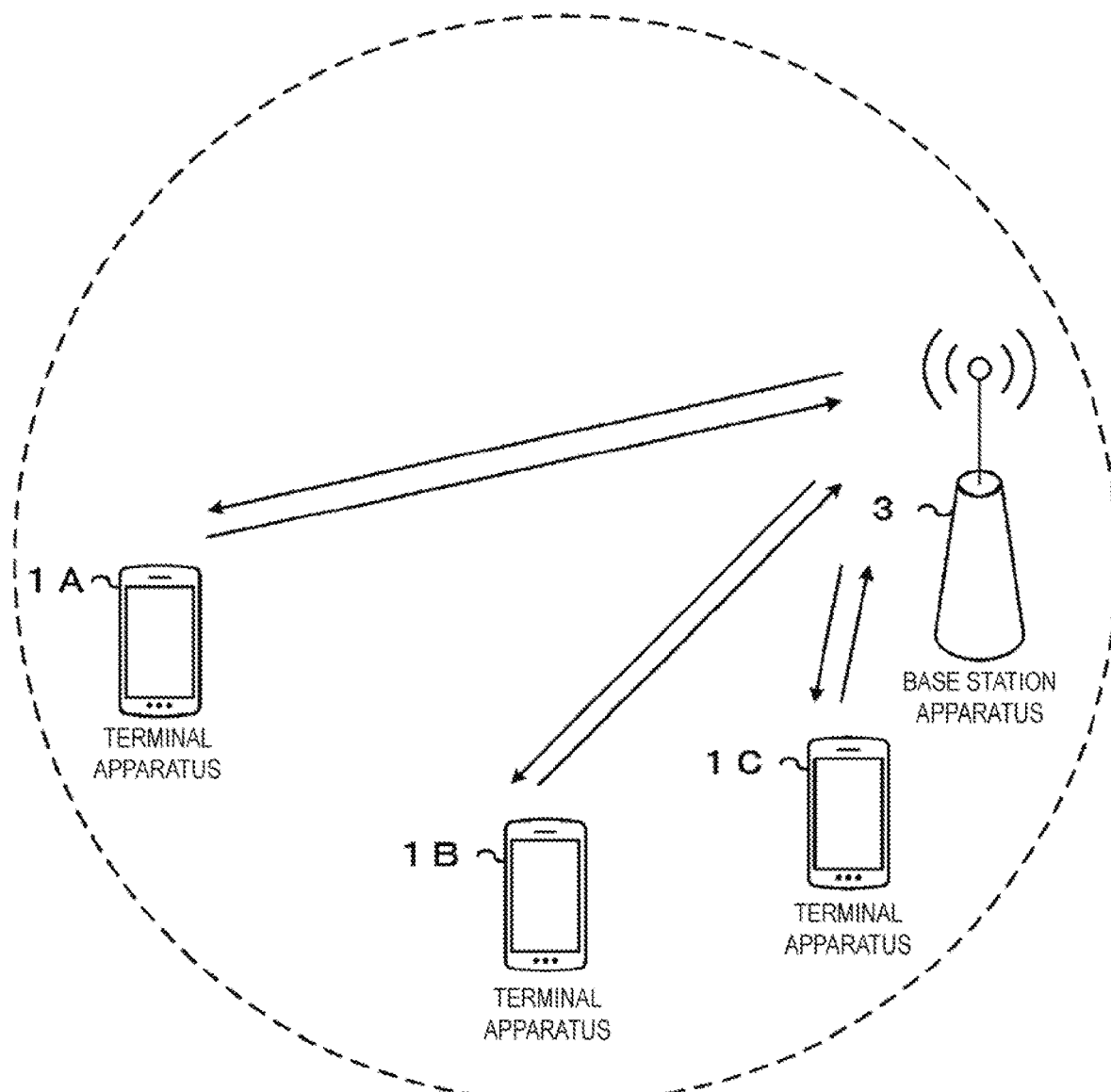
FIG. 1 is a conceptual diagram of a radio communication system, according to the present embodiment.

FIG. 1 is a conceptual diagram of a radio communication system according to the present embodiment. In FIG. 1, the radio communication system includes terminal apparatuses 1A to 1C and a base station apparatus 3. Each of the terminal apparatuses 1A to 1C is referred to as a terminal apparatus 1 below.

Now, carrier aggregation will be described.

Multiple serving cells may be configured for the terminal apparatus 1. A technology in which the terminal apparatus 1 communicates via the multiple serving cells is referred to as cell aggregation or carrier aggregation. The present invention may be applied to each of the multiple serving cells configured for the terminal apparatus 1. Furthermore, the present invention may be applied to some of the configured multiple serving cells. Furthermore, the present invention may be applied to each of groups of the configured multiple serving cells. Furthermore, the present invention may be applied to some of the groups of the configured multiple serving cells. In carrier aggregation, the configured multiple serving cells are also referred to as aggregated serving cells.

Time Division Duplex (TDD) and/or Frequency Division Duplex (FDD) is applied to a radio communication system in the present embodiment. For cell aggregation, TDD may be applied to all multiple serving cells. Alternatively, in cell aggregation, serving cells to which TDD is applied and serving cells to which FDD is applied may be aggregated. The serving cells to which TDD is applied are also referred to as TDD serving cells, or serving cells using the Frame structure Type 2 in the present embodiment.

The configured multiple serving cells include one primary cell and one or multiple secondary cells. The primary cell is a serving cell in which an initial connection establishment procedure has been performed, a serving cell in which a connection re-establishment procedure has been started, or a cell indicated as a primary cell during a handover procedure. At the point in time when a Radio Resource Control (RRC) connection is established, or later, a secondary cell may be configured.

A carrier corresponding to a serving cell in a downlink is referred to as a downlink component carrier. A carrier corresponding to a serving cell in an uplink is referred to as an uplink component carrier. The downlink component carrier and the uplink component carrier are collectively referred to as a component carrier. In TDD, a carrier corresponding to a serving cell in an uplink is identical to a carrier corresponding to a serving cell in a downlink.

The terminal apparatus 1 can perform simultaneous transmission on multiple physical channels/of multiple physical signals in multiple TDD serving cells (component carriers) to be aggregated in an identical band. The terminal apparatus 1 can perform simultaneous reception on multiple physical channels/of multiple physical signals in multiple TDD serving cells (component carriers) to be aggregated in an identical band.

Physical channels and physical signals in the present embodiment will be described.

Figure 3:
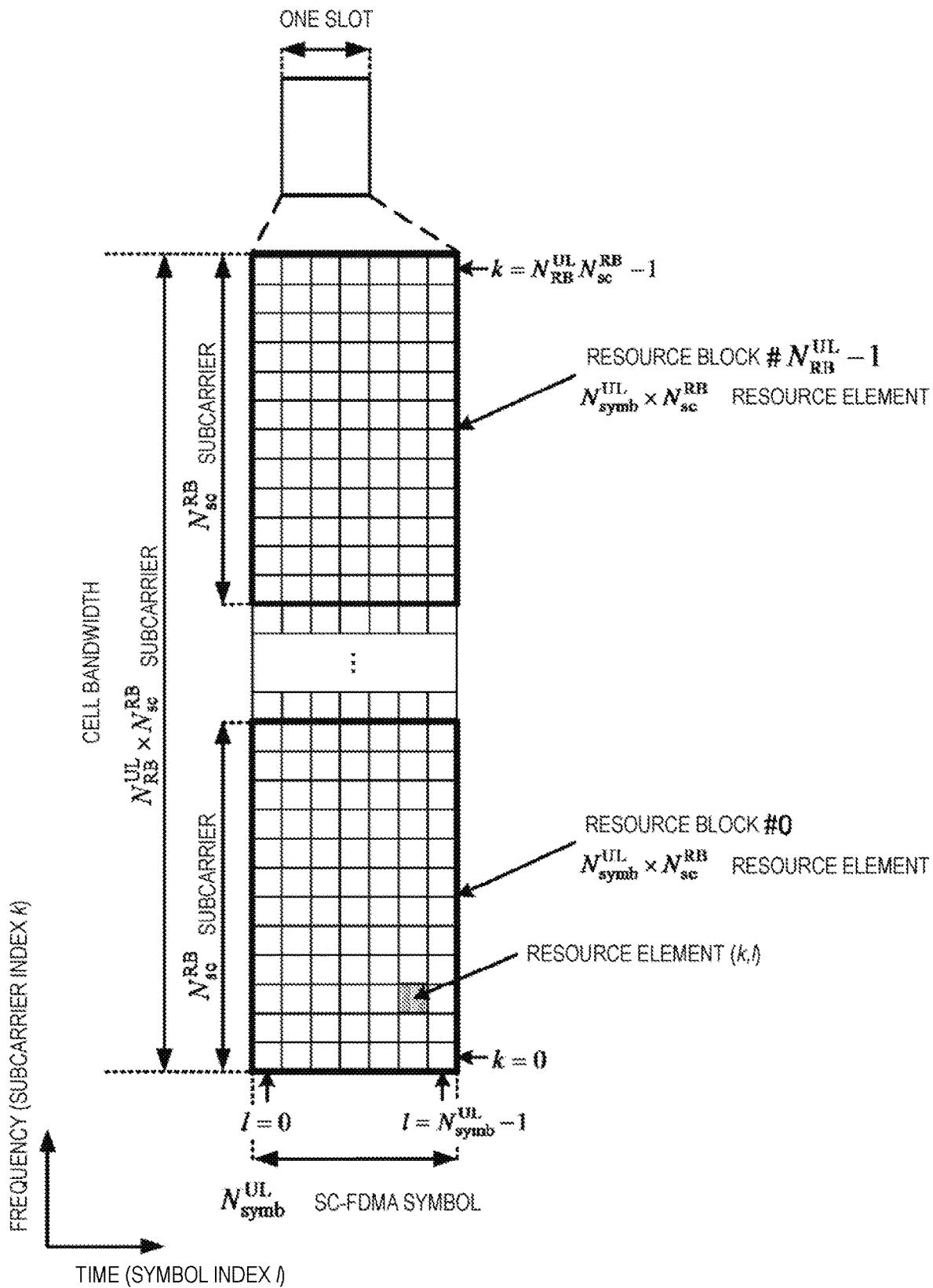
FIG. 3 is a diagram illustrating a schematic constitution of an uplink slot, according to the present embodiment.

In FIG. 3, the following uplink physical channels are used for uplink radio communication from the terminal apparatus 1 to the base station apparatus 3. The uplink physical channels are used for transmission of information output from higher layers.

Physical Uplink Control CHannel (PUCCH)
Physical Uplink Shared CHannel (PUSCH)
Physical Random Access CHannel (PRACH)

The PUCCH is used for transmission of Uplink Control Information (UCI). The uplink control information includes: downlink Channel State Information (CSI); a Scheduling Request (SR) used to request for a PUSCH (UpLink-Shared CHannel: UL-SCH) resource for initial transmission; and a Hybrid Automatic Repeat reQuest ACKnowledgement (HARQ-ACK) for downlink data (a Transport block, a Medium Access Control Protocol Data Unit (MAC PDU), a DownLink-Shared CHannel (DL-SCH), or a Physical Downlink Shared CHannel (PDSCH)).

The PUSCH is used for transmission of uplink data (UpLink-Shared CHannel (UL-SCH)). Furthermore, the PUSCH may be used to transmit the HARQ-ACK and/or channel state information along with the uplink data. Furthermore, the PUSCH may be used to transmit only the channel state information or to transmit only the HARQ-ACK and the channel state information.

The PRACH is used to transmit a random access preamble.

In FIG. 3, the following uplink physical signal is used in the uplink radio communication. The uplink physical signal is not used for transmission of information output from the higher layer, but is used by a physical layer.

UpLink Reference Signal (UL RS)

In the present embodiment, the following two types of uplink reference signals are used.

DeModulation Reference Signal (DMRS)
Sounding Reference Signal/Sounding Reference Symbol (SRS)

The DMRS is associated with transmission of the PUSCH or the PUCCH. The DMRS is time-multiplexed with the PUSCH or the PUCCH. The base station apparatus 3 uses the DMRS in order to perform channel compensation of the PUSCH or the PUCCH. Transmission of both of the PUSCH and the DMRS is hereinafter referred to simply as transmission of the PUSCH. Transmission of both of the PUCCH and the DMRS is hereinafter referred to simply as transmission of the PUCCH.

The SRS is not associated with the transmission of the PUSCH or the PUCCH. The base station apparatus 3 may use the SRS for measuring a channel state. The SRS is transmitted in the last Single Carrier-Frequency Division Multiple Access (SC-FDMA) symbol in an uplink subframe, or an SC-FDMA symbol in UpPTS.

The SRS transmission is triggered by a higher layer signal and/or a DCI format. A trigger by the higher layer signal is also referred to as a trigger type 0. A trigger by the DCI format is also referred to as a trigger type 1.

The SRS corresponding to the trigger type 0 is transmitted in a first resource (a subframe and an SC-FDMA symbol) indicated by the higher layer signal. The SRS corresponding to the trigger type 1 is transmitted in a second resource (a subframe and an SC-FDMA symbol) indicated by the higher layer signal. The SRS corresponding to the trigger type 1 is transmitted only once in accordance with a trigger based on one DCI format.

One terminal apparatus 1 may transmit the SRS in each of multiple SC-FDMA symbols in one UpPTS. One terminal apparatus 1 may transmit the SRS corresponding to the trigger type 0 in each of multiple SC-FDMA symbols in one UpPTS. Here, the multiple SC-FDMA symbols in the one UpPTS are preferably contiguous in a time domain. The base station apparatus 3 may transmit information indicating multiple contiguous SC-FDMA symbols in UpPTS as a first resource to the terminal apparatus 1.

In FIG. 3, the following downlink physical channels are used for downlink radio communication from the base station apparatus 3 to the terminal apparatus 1. The downlink physical channels are used for transmission of information output from higher layers.

Physical Broadcast CHannel (PBCH)
Physical Control Format Indicator CHannel (PCFICH)
Physical Hybrid automatic repeat request Indicator CHannel (PHICH)
Physical Downlink Control CHannel (PDCCH)
Enhanced Physical Downlink Control CHannel (EPDCCH)
Physical Downlink Shared CHannel (PDSCH)
Physical Multicast CHannel (PMCH)

The PBCH is used for broadcasting a Master Information Block (MIB, Broadcast CHannel (BCH)), that is shared by the terminal apparatuses 1.

The PCFICH is used for transmission of information indicating a region (OFDM symbols) to be used for transmission of the PDCCH.

The PHICH is used for transmission of a HARQ indicator (HARQ feedback or response information) indicating an ACKnowledgement (ACK) or a Negative ACKnowledgement (NACK) for the uplink data (UpLink Shared CHannel (UL-SCH)) received by the base station apparatus 3.

The PDCCH and the EPDCCH are used for transmission of Downlink Control Information (DCI). The Downlink Control Information is also referred to as a DCI format. The Downlink Control Information includes a downlink grant and an uplink grant. The downlink grant is also referred to as downlink assignment or downlink allocation.

The downlink grant is used for scheduling of a single PDSCH within a single cell. The downlink grant is used for scheduling of the PDSCH within a subframe same as the subframe in which the downlink grant is transmitted.

The uplink grant is used for scheduling of a single PUSCH within a single cell. The uplink grant is used for scheduling of a single PUSCH within the fourth or later subframe from the subframe in which the uplink grant is transmitted. The uplink grant transmitted on the PDCCH is also referred to as a DCI format 0.

CRC parity bits attached to the downlink grant or the uplink grant are scrambled with a Cell-Radio Network Temporary Identifier (C-RNTI), a Temporary C-RNTI, or a Semi Persistent Scheduling Cell-Radio Network Temporary Identifier (SPS C-RNTI). The C-RNTI and the SPS C-RNTI are identifiers for identifying a terminal apparatus within a cell. The Temporary C-RNTI is an identifier used for identifying the terminal apparatus 1 that has transmitted a random access preamble in a contention based random access procedure.

The C-RNTI and the Temporary C-RNTI are used to control the PDSCH or the PUSCH in a single subframe. The SPS C-RNTI is used to periodically allocate a resource for the PDSCH or the PUSCH.

The PDSCH is used for transmission of downlink data (DownLink Shared CHannel (DL-SCH)).

The PMCH is used for transmission of multicast data (Multicast Channel (MCH)).

In FIG. 3, the following downlink physical signals are used in the downlink radio communication. The downlink physical signals are not used for transmission of information output from the higher layer, but are used by the physical layer.

Synchronization Signal (SS)
DownLink Reference Signal (DL RS)

The synchronization signal is used in order for the terminal apparatus 1 to synchronize in frequency and time domains in the downlink. In the TDD scheme, the synchronization signal is mapped to subframes 0, 1, 5, and 6 within a radio frame. In the FDD scheme, the synchronization signal is mapped to subframes 0 and 5 within a radio frame.

The downlink reference signal is used in order for the terminal apparatus 1 to perform channel compensation on a downlink physical channel. The downlink reference signal is used in order for the terminal apparatus 1 to calculate downlink channel state information.

The downlink physical channels and the downlink physical signals are collectively referred to as a downlink signal. The uplink physical channels and the uplink physical signals are collectively referred to as an uplink signal. The downlink physical channels and the uplink physical channels are collectively referred to as a physical channel. The downlink physical signals and the uplink physical signals are collectively referred to as a physical signal.

The BCH, the MCH, the UL-SCH, and the DL-SCH are transport channels. A channel used in a Medium Access Control (MAC) layer is referred to as a transport channel. A unit of the transport channel used in the MAC layer is also referred to as a Transport Block (TB) or a MAC Protocol Data Unit (PDU). A Hybrid Automatic Repeat reQuest (HARQ) is controlled for each transport block in the MAC layer. The transport block is a unit of data that the MAC layer delivers to the physical layer. In the physical layer, the transport block is mapped to a codeword and subjected to coding processing on a codeword-by-codeword basis.

The base station apparatus 3 and the terminal apparatus 1 exchange (transmit and/or receive) a signal in the higher layer. For example, the base station apparatus 3 and the terminal apparatus 1 may transmit and/or receive, in a Radio Resource Control (RRC) layer, RRC signaling (also referred to as a Radio Resource Control message (RRC message) or Radio Resource Control information (RRC information)). Furthermore, the base station apparatus 3 and the terminal apparatus 1 may transmit and/or receive, in the Medium Access Control (MAC) layer, a MAC Control Element (CE). Here, the RRC signaling and/or the MAC CE is also referred to as higher layer signaling. The PUSCH and the PDSCH are used for transmission of the RRC signaling and the MAC CE.

Figure 2:
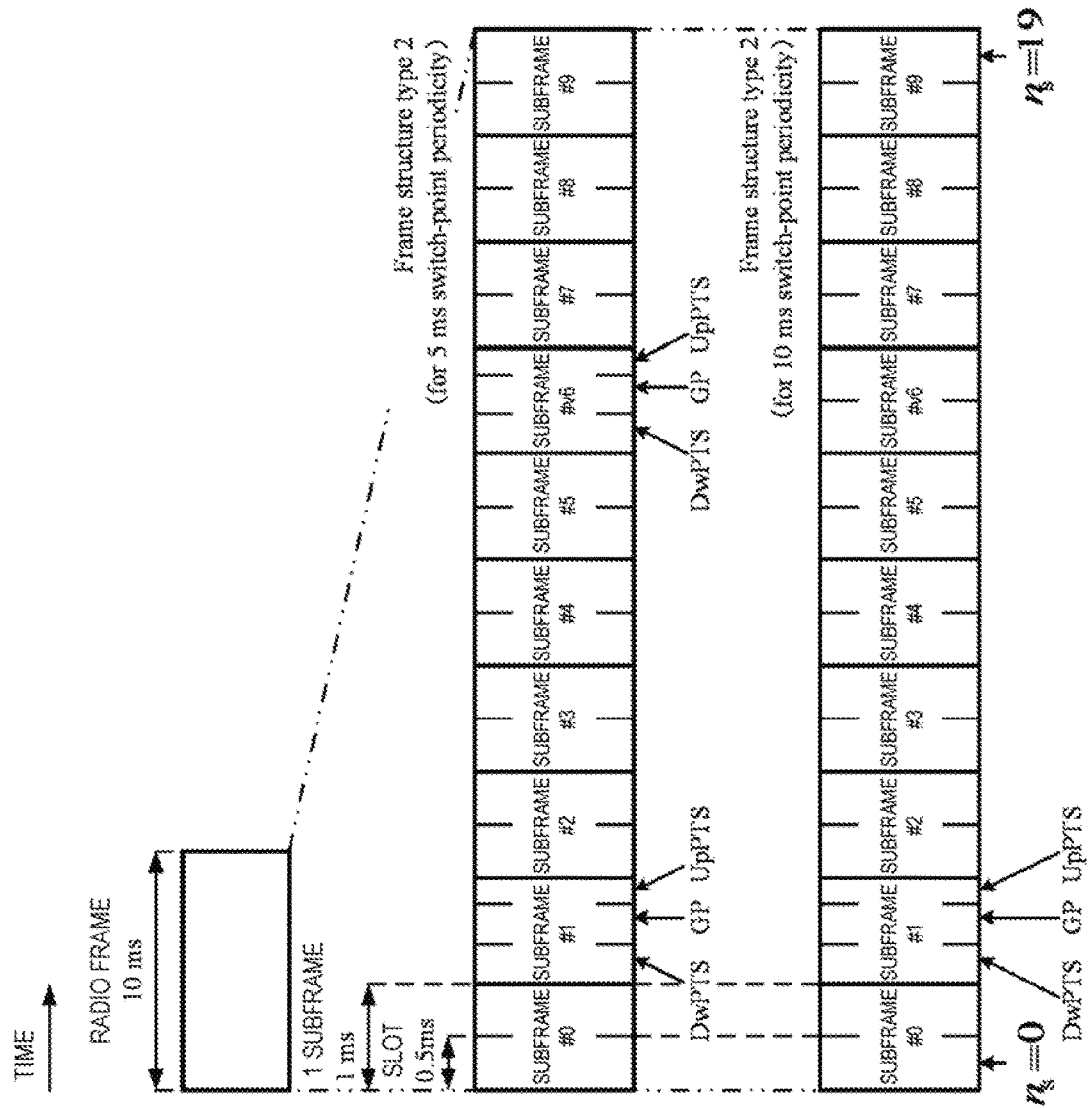
FIG. 2 is a diagram illustrating a schematic constitution of a radio frame of a Frame structure Type 2, according to the present embodiment.

FIG. 2 is a diagram illustrating a schematic constitution of a radio frame of the Frame structure Type 2 according to the present embodiment. The Frame structure Type 2 is applicable to TDD. In FIG. 2, the horizontal axis is a time axis.

Various field sizes in a time domain are expressed by the number of time units $T_s=1/(15000\times2048)$ seconds. A length of the radio frame of the Frame structure Type 2 is $T_f=307200\times T_s=10$ ms. The radio frame of the Frame structure Type 2 includes two contiguous half-frames in the time domain. A length of each of the half-frames is $T_{half-frame}=153600\times T_s=5$ ms. Each of the half-frames includes five contiguous subframes in the time domain. A length of each of the subframes is $T_{subframe}=30720\times T_s=1$ ms. Each of the subframes i includes two contiguous slots in the time domain. The two contiguous slots in the time domain are a slot having a slot number $n_s$ of 2i in the radio frame and a slot having a slot number $n_s$ of 2i+1 in the radio frame. A length of each of the slots is $T_{slot}=153600\times n_s=0.5$ ms. Each of the radio frames includes 10 contiguous subframes in the time domain. Each of the radio frames includes 20 contiguous slots ($n_s=0, 1, \ldots, 19$) in the time domain.

A constitution of a slot according to the present embodiment will be described below. FIG. 3 is a diagram illustrating a schematic constitution of an uplink slot according to the present embodiment. FIG. 3 illustrates the constitution of the uplink slot in one cell. In FIG. 3, the horizontal axis is a time axis, and the vertical axis is a frequency axis. In FIG. 3, l is an SC-FDMA symbol number/index, and k is a subcarrier number/index.

The physical signal or the physical channel transmitted in each of the slots is expressed by a resource grid. In an uplink, the resource grid is defined by multiple subcarriers and multiple SC-FDMA symbols. Each element within the resource grid is referred to as a resource element. The resource element is expressed by the subcarrier number/index k and the SC-FDMA symbol number/index l.

The resource grid is defined for each antenna port. In the present embodiment, description is given for one antenna port. The present embodiment may be applied to each of multiple antenna ports.

The uplink slot includes multiple SC-FDMA symbols l ($l=0, 1, \ldots$, and $N^{UL}_{symb}$) in the time domain. $N^{UL}_{symb}$ indicates the number of SC-FDMA symbols included in one uplink slot. For a normal Cyclic Prefix (CP) in the uplink, $N^{UL}_{symb}$ is 7. For an extended Cyclic Prefix (extended CP) in the uplink, $N^{UL}_{symb}$ is 6.

The terminal apparatus 1 receives a parameter UL-CyclicPrefixLength indicating a CP length in the uplink from the base station apparatus 3. The base station apparatus 3 may broadcast system information including the parameter UL-CyclicPrefixLength corresponding to a cell in the cell.

FIG. 4 is a diagram illustrating one example of an uplink cyclic prefix configuration according to the present embodiment. $N_{cp,l}$ indicates an uplink CP length for the SC-FDMA symbol l in a slot. In a case that the uplink cyclic prefix configuration (UL-CyclicPrefixLength) is the normal cyclic prefix, $N_{cp,0}=160$ for l=0. A length of the SC-FDMA symbol l without the CP length is $2048\times T_s$, and a length of the SC-FDMA symbol l with the CP length is $(N_{cp,l}+2048)\times T_s$.

The uplink slot includes multiple subcarriers k ($k=0, 1, \ldots, N^{UL}_{RB}\times N^{RB}_{sc}$) in the frequency domain. $N^{UL}_{RB}$ is an uplink bandwidth configuration for a serving cell, which is expressed by a multiple of $N^{RB}_{sc}$. $N^{RB}_{sc}$ is a (physical) resource block size in the frequency domain, which is expressed by the number of the subcarriers. In the present embodiment, a subcarrier interval Δf is 15 kHz, and $N^{RB}_{sc}$ is 12. That is, in the present embodiment, $N^{RB}_{sc}$ is 180 kHz.

A resource block is used to express mapping of a physical channel to resource elements. For the resource block, a virtual resource block and a physical resource block are defined. The physical channel is first mapped to the virtual resource block. Thereafter, the virtual resource block is mapped to the physical resource block. One physical resource block is defined by $N^{UL}_{symb}$ contiguous SC-FDMA symbols in the time domain and by $N^{RB}_{sc}$ contiguous subcarriers in the frequency domain. Hence, one physical resource block is constituted by ($N^{UL}_{symb}\times N^{RB}_{sc}$) resource elements. One physical resource block corresponds to one slot in the time domain. The physical resource blocks are numbered (0, 1, \ldots, $N^{UL}_{RB}-1$) in an order starting from a lower frequency in the frequency domain.

A downlink slot in the present embodiment includes multiple OFDM symbols. A constitution of the downlink slot in the present embodiment is basically identical except that a resource grid is defined by multiple subcarriers and multiple OFDM symbols, and thus description of the constitution of the downlink slot is omitted.

In a TDD serving cell, a value of an uplink bandwidth configuration for the TDD serving cell is identical to a value of a downlink bandwidth configuration for the TDD serving cell.

A resource block is used to express mapping of a certain physical channel (such as the PDSCH or the PUSCH) to resource elements. For the resource block, a virtual resource block and a physical resource block are defined. A certain physical channel is first mapped to a virtual resource block. Thereafter, the virtual resource block is mapped to the physical resource block. One physical resource block is defined by seven consecutive OFDM symbols or SC-FDMA symbols in a time domain and by 12 consecutive subcarriers in a frequency domain. Hence, one physical resource block includes (7×12) resource elements. Furthermore, one physical resource block corresponds to one slot in the time domain and corresponds to 180 kHz in the frequency domain. Physical resource blocks are numbered from 0 in the frequency domain.

A time-continuous signal si (t) in the SC-FDMA symbol l in the uplink slot is given by Equation (1). Equation (1) is applied to the uplink physical signal and the uplink physical channel without the PRACH.

$$s_l(t) = \sum_{k=-\lfloor N_{RB}^{UL} N_{sc}^{RB}/2 \rfloor}^{\lceil N_{RB}^{UL} N_{sc}^{RB}/2 \rceil - 1} a_{k^{(-)},l} \cdot e^{j2\pi(k+1/2)\Delta f(t - N_{CP,l}T_s)}$$ [Equation 1]

for $0 \leq t < (N_{CP,l} + 2048) \times T_s$ where $k^{(-)} = k + \lfloor N_{RB}^{UL} N_{sc}^{RB}/2 \rfloor$ and $\Delta f = 15$ kHz Here, $a_{k,l}$ is content of a resource element (k,l). The SC-FDMA symbols in a slot are transmitted starting from l=0 in an ascending order of 1. The SC-FDMA symbol l>0 starts at a time defined by Equation (2) in the slot.

$$\Sigma_{l'=0}^{l-1}(N_{CP,l'}+N)T_s$$ [Equation 2]

Hereinafter, an uplink/downlink configuration (UL/DL configuration) according to the present embodiment will be described.

Following three types of subframes are defined for the Frame structure Type 2.
  Downlink subframe
  Uplink subframe
  Special subframe The downlink subframe is a subframe reserved for downlink transmission. The uplink subframe is a subframe reserved for uplink transmission. The special subframe is constituted of three fields. The three fields are a Downlink Pilot Time Slot (DwPTS), a Guard Period (GP), and the Uplink Pilot Time Slot (UpPTS). The sum of lengths of the DwPTS, the GP, and the UpPTS is 1 ms. The DwPTS is a field reserved for the downlink transmission. The UpPTS is a field reserved for the uplink transmission. The GP is a field in which neither the downlink transmission nor the uplink transmission is performed. Moreover, the special subframe may be constituted of only the DwPTS and the GP, or may be constituted of only the GP and the UpPTS.

A radio frame of the Frame structure Type 2 is constituted of at least the downlink subframe, the uplink subframe, and the special subframe. A constitution of the radio frame of the Frame structure Type 2 is indicated by the UL/DL configuration. The terminal apparatus 1 receives information indicating the UL/DL configuration from the base station apparatus 3. The base station apparatus 3 may broadcast system information including the UL/DL configuration corresponding to a cell in the cell.

Figure 7:
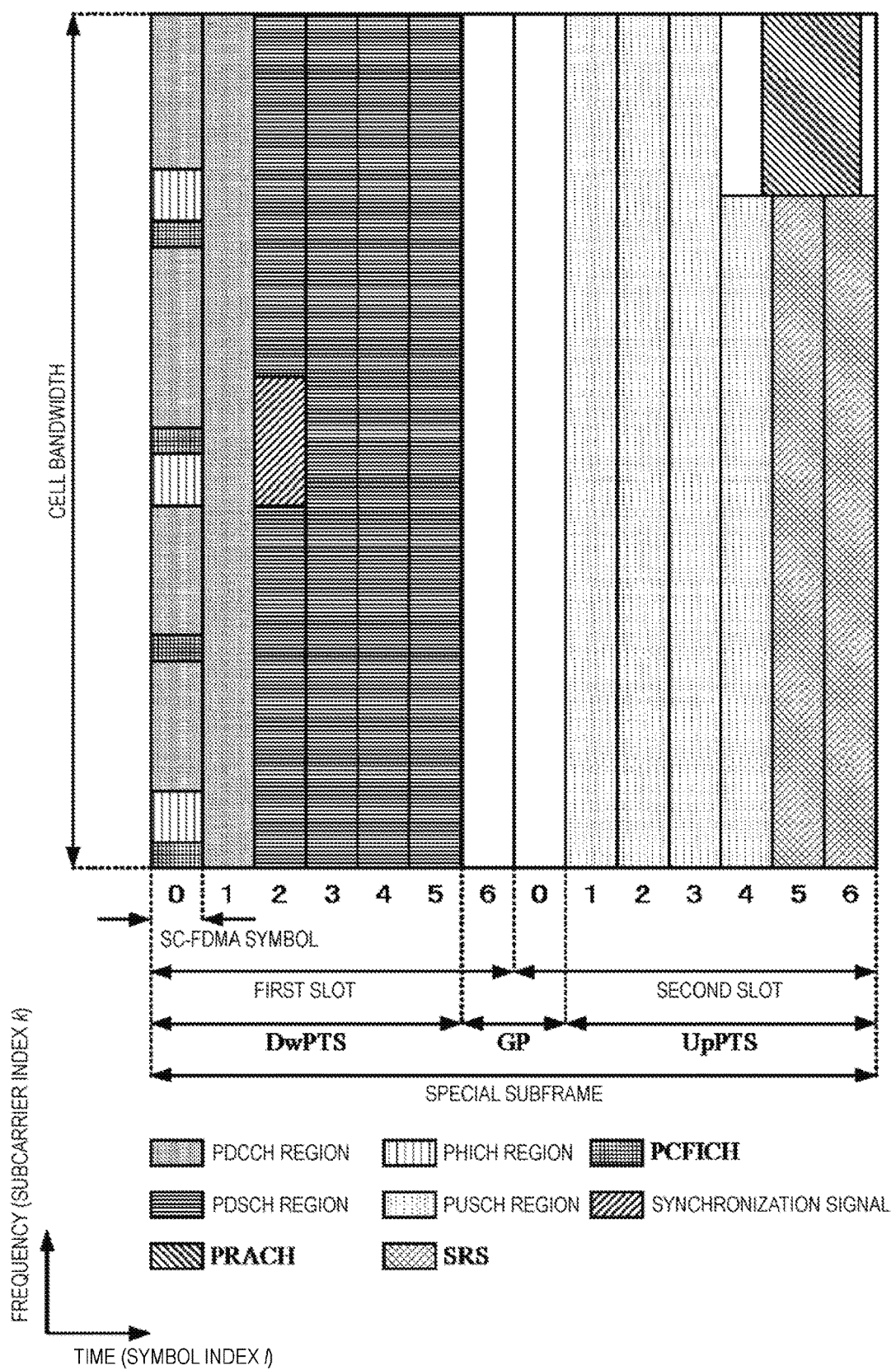
FIG. 7 is a diagram illustrating one example of a special subframe, according to the present embodiment.

FIG. 5 is a diagram illustrating the UL/DL configurations according to the present embodiment. FIG. 5 illustrates the UL/DL configurations in one radio frame. In FIG. 7, D denotes the downlink subframe, U denotes the uplink subframe, and S denotes the special subframe.

According to FDD, all subframes are downlink subframes. According to FDD, all subframes are uplink subframes.

Figure 6:
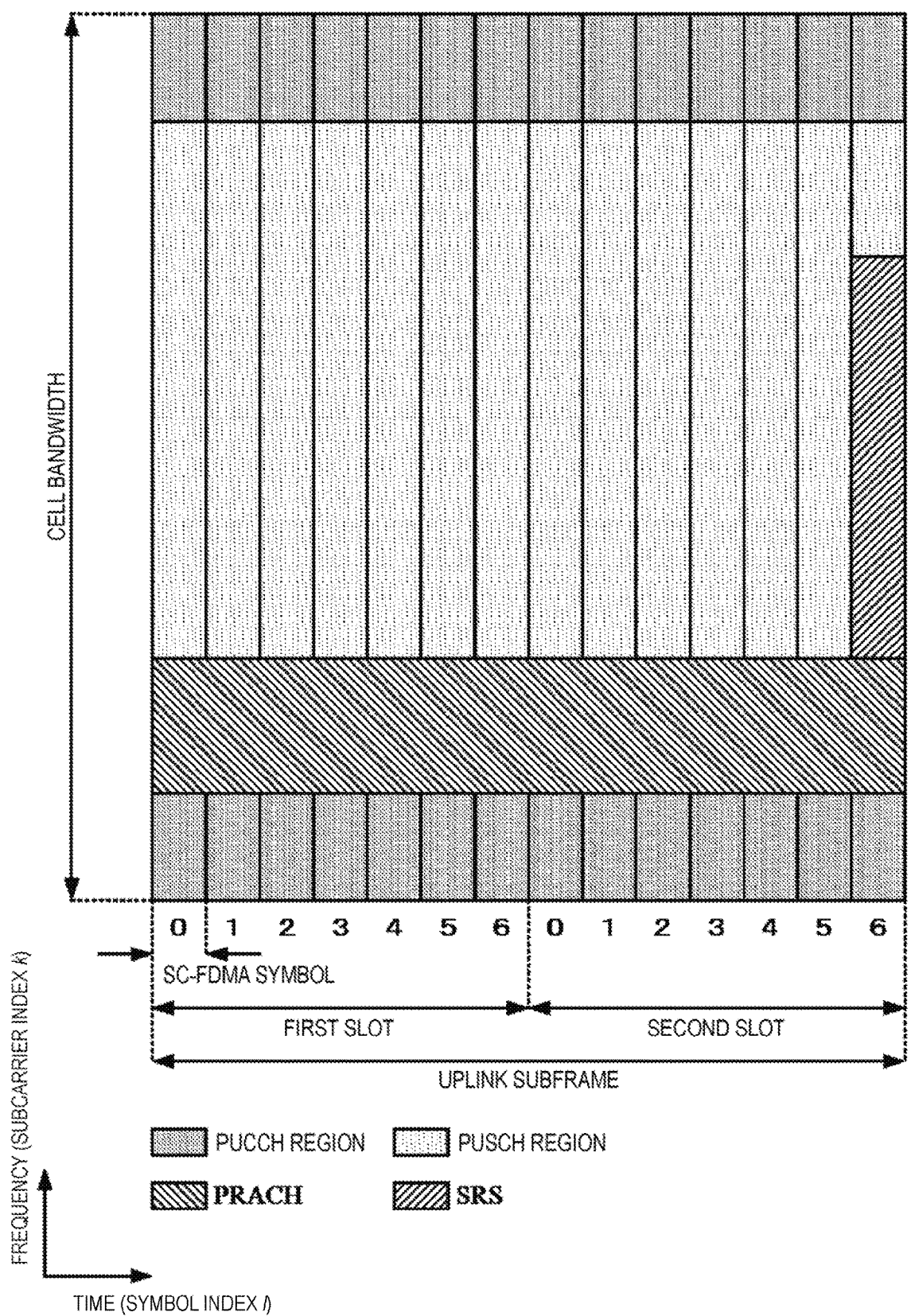
FIG. 6 is a diagram illustrating one example of an uplink subframe, according to the present embodiment.

FIG. 6 is a diagram illustrating one example of the uplink subframe according to the present embodiment. FIG. 7 is a diagram illustrating one example of the special subframe according to the present embodiment. In FIG. 6 and FIG. 7, the horizontal axis is a time axis, and the vertical axis is a frequency axis. In FIG. 6 and FIG. 7, a downlink cyclic prefix configuration, and the uplink cyclic prefix configuration are normal cyclic prefixes.

The DwPTS includes a first symbol of the special subframe. The UpPTS includes a last symbol of the special subframe. The GP exists between the DwPTS and the UpPTS. The terminal apparatus 1 may switch from downlink reception processing to uplink transmission processing during the GP. In the UpPTS, the PUSCH, the SRS, and the PRACH are transmitted.

FIG. 8 is a diagram illustrating one example of special subframe configurations for the normal cyclic prefix in the downlink according to the present embodiment. In a case that the special subframe configuration for the normal cyclic prefix in the downlink is 0, a length of the DwPTS is 6592×$T_s$, and the DwPTS includes three OFDM symbols including the normal cyclic prefix. In a case that the special subframe configuration for the normal cyclic prefix in the downlink is 0, and an uplink cyclic prefix configuration is the normal cyclic prefix, a length of the UpPTS is (1+x)× 2192×$T_s$, and the UpPTS includes (1+X) SC-FDMA symbols including the normal cyclic prefix.

This X is the number of added SC-FDMA symbols in the UpPTS. A value of this X may be given based on the parameter UpPtsAdd of an RRC layer received from the base station apparatus 3. A default value of this X may be 0. That is, in a case that the value of this X is not configured by the parameter of the RRC layer, the value of this X may be 0. The added SC-FDMA symbol is also referred to as an extended SC-FDMA symbol. Based on the parameter UpPtsAdd of the RRC layer, 1 of (1+X) is the number of SC-FDMA symbols not added in the UpPTS.

The parameter UpPtsAdd of this RRC layer may include a parameter srs-UpPtsAdd, a parameter pusch-UpPtsAdd, and a parameter pucch-UpPtsAdd. The SRS may be transmitted in the UpPTS added based on the parameter srs-UpPtsAdd. The PUSCH and the PUCCH are not transmitted in UpPTS added based on the parameter srs-UpPtsAdd. The PUSCH and the SRS may be transmitted in the UpPTS added based on the parameter pusch-UpPtsAdd. The PUCCH is not transmitted in the UpPTS added based on the parameter pusch-UpPtsAdd. The PUSCH, the PUCCH and the SRS may be transmitted in the UpPTS added based on the parameter pucch-UpPtsAdd.

The SRS may be transmitted in the UpPTS not added based on the parameter UpPtsAdd of this RRC layer. The PUSCH and the PUCCH are not transmitted in the UpPTS not added based on the parameter UpPtsAdd of this RRC layer.

That is, the base station apparatus 3 may control whether the PUSCH and the PUCCH may be transmitted in a UpPTS field to which the terminal apparatus 1 is added, using the parameters of the RRC layer.

For example, in a case that a value of the parameter pusch-UpPtsAdd is 6, a value of (Y+X) is 6. This Y is 1 or 2. Here, in a case that the special subframe configuration is 0, a value of Y is 1, and a value of X is 5. In a case that the special subframe configuration is 5 or 9, the value of Y is 2, and the value of X is 4.

The parameter UpPtsAdd may include a parameter indicating a special subframe to which this parameter UpPtsAdd corresponds. As for a certain serving cell, the parameter UpPtsAdd may be applied to all special subframes. As for a certain serving cell, the parameter UpPtsAdd may be applied to some of special subframes. For example, the parameter UpPtsAdd may be applied to a special subframe having a subframe number 1, and the parameter UpPtsAdd may not necessarily be applied to a special subframe having a subframe number 6. That is, the special subframe having the subframe number 1 may include the UpPTS that is added, and the special subframe having the subframe number 6 may include the UpPTS that is not added.

Figure 9:
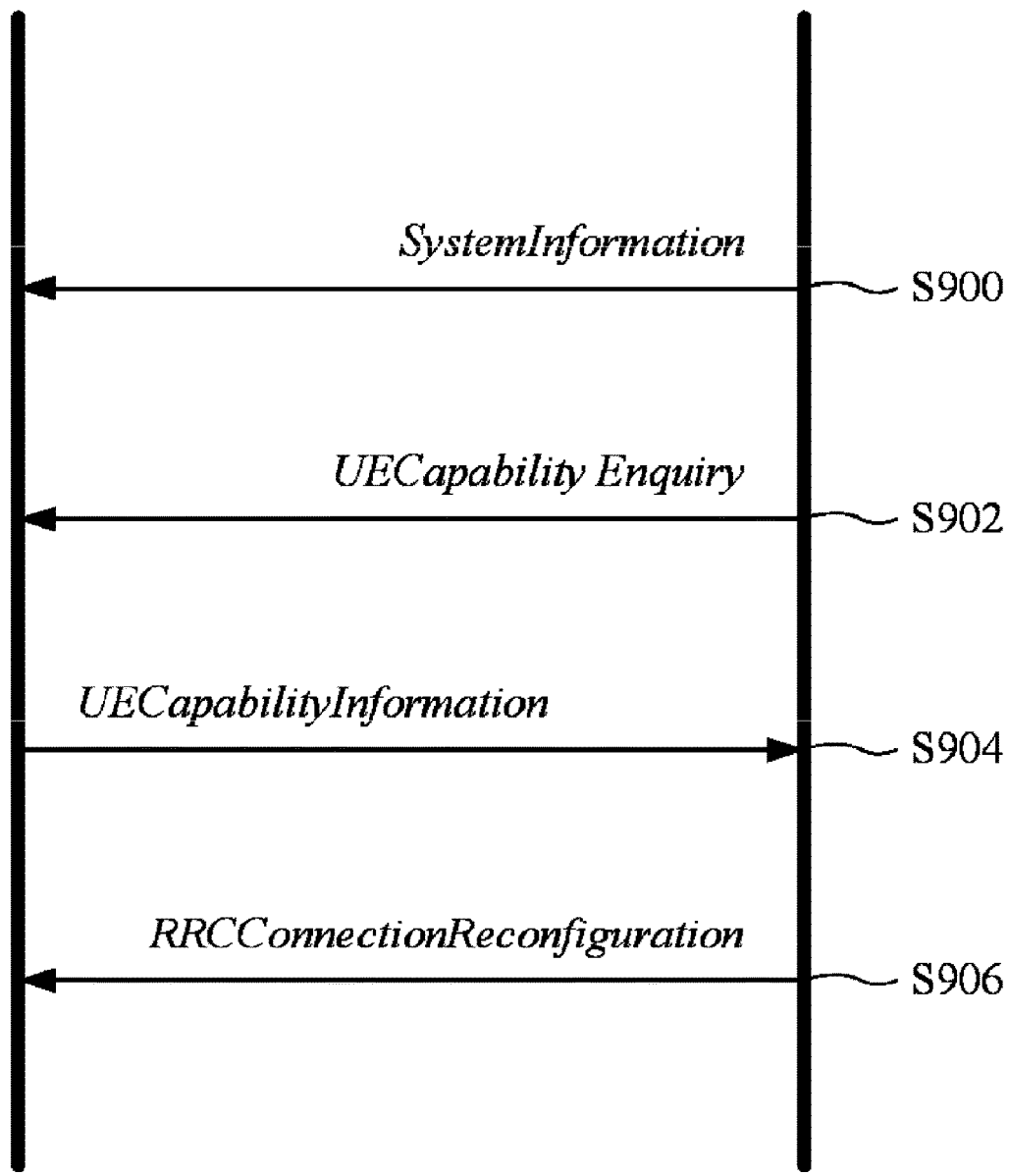
FIG. 9 is a diagram illustrating one example of an acquisition method of a parameter UpPtsAdd, according to the present embodiment.

FIG. 9 is a diagram illustrating one example of an acquisition method of the parameter UpPtsAdd according to the present embodiment. The method in FIG. 9 may be applied to the primary cell.

In Step S900, the base station apparatus 3 broadcasts system information. The terminal apparatus 1 receives broadcasted system information. Here, the system information may include the parameter UL-CycliePrefixLength indicating the CP length in the uplink, a parameter special-SubframePatterns indicating the special subframe configuration, and a parameter subframeAssignment indicating the UL/DL configuration. Here, the parameter UL-CyclicPrefixLength, the parameter specialSubframePatterns, and the parameter subframeAssignment are cell specific parameters. The system information is transmitted using a Broadcast Control CHannel (BCCH). The BCCH is a downlink logical channel for broadcasting system control information.

In step S902, the base station apparatus 3 transmits, to the terminal apparatus 1, information UECapabilityEnquiry used for requesting transmission of capability information UECapabilityInformation related to the terminal apparatus 1.

In Step S904, the terminal apparatus 1 transmits the capability information UECapabilityInformation related to the terminal apparatus 1 in accordance with the information UECapabilityEnquiry to the base station apparatus 3. The capability information UECpabilityInformation, In Step S906, the base station apparatus 3 generates information RRCConnectionReconfiguration for modifying an RRC connection in accordance with the received capability information UECapabilityInformation, and transmits the generated information RRCConnectionReconfiguration to the terminal apparatus 1. Here, the information RRCConnectionReconfiguration may include the parameter UpPtsAdd. The base station apparatus 3 may decide whether to include the parameter UpPtsAdd in the information RRCConnectionReconfiguration in accordance with the received capability information UECapabilityInformation. The base station apparatus 3 may decide whether to include the parameter srs-UpPtsAdd, the parameter pusch-UpPtsAdd, and/or the parameter pucch-UpPtsAdd in the parameter UpPtsAdd in accordance with the received capability information UECapabilityInformation. The information RRCConnectionReconfiguration is transmitted using a Dedicated Control CHannel (DCCH). The DCCH is a point-to-point bidirectional logical channel for transmitting dedicated control information between the base station apparatus 3 (network) and the terminal apparatus 1.

The capability information UECapabilityInformation transmitted in Step S904 may at least indicate some or all of the following (i) to (x). The capability information UECapabilityInformation may at least include one or multiple pieces of information/parameters indicating some or all of the following (i) to (x). The following (i) to (x) may be indicated individually. Some of the following (i) to (x) may be indicated collectively.

(i) Whether the terminal apparatus 1 supports adding the UpPTS.

(ii) Whether the terminal apparatus 1 supports SRS transmission in the added UpPTS.

(iii) Whether the terminal apparatus 1 supports SRS transmission in the UpPTS added by the parameter srs-UpPtsAdd.

(iv) Whether the terminal apparatus 1 supports SRS transmission in the UpPTS added by the parameter pusch-UpPtsAdd.

(v) Whether the terminal apparatus 1 supports SRS transmission in the UpPTS added by the parameter pucch-UpPtsAdd.

(vi) Whether the terminal apparatus 1 supports PUSCH transmission in the added UpPTS.

(vii) Whether the terminal apparatus 1 supports PUSCH transmission in the UpPTS added by the parameter pusch-UpPtsAdd.

(viii) Whether the terminal apparatus 1 supports PUSCH transmission in the UpPTS added by the parameter pucch-UpPtsAdd.

(ix) Whether the terminal apparatus 1 supports PUCCH transmission in the added UpPTS.

(x) Whether the terminal apparatus 1 supports PUCCH transmission in the UpPTS added by the parameter pucch-UpPtsAdd.

The terminal apparatus 1 supporting (vii) described above may always support (ii) and (iv) described above. The terminal apparatus 1 supporting (x) described above may always support (ii), (v), (vi) and (viii) described above.

Figure 13:
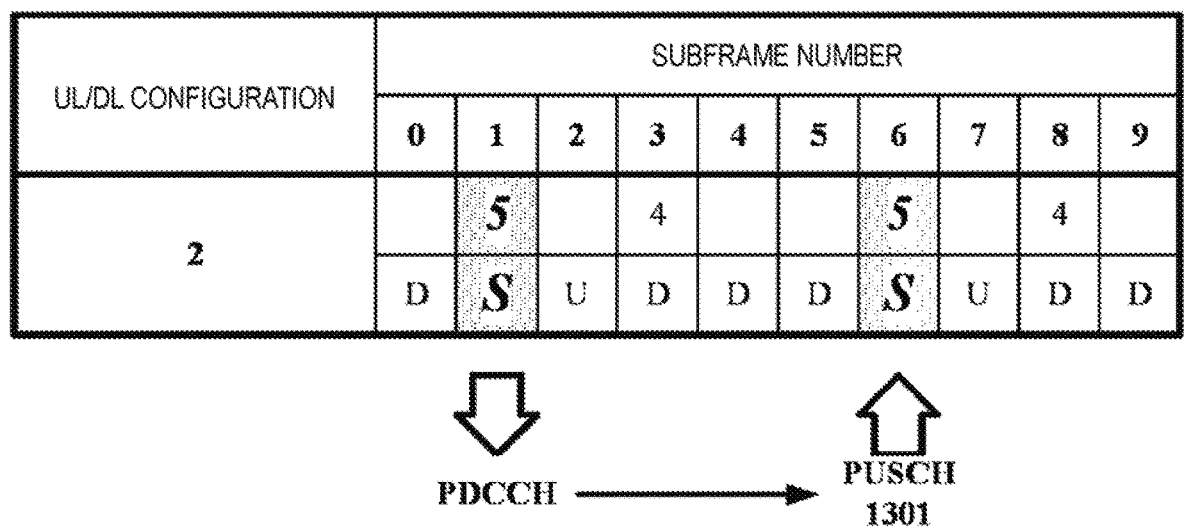
FIG. 13 is a diagram illustrating the second example of the relation between the subframe in which the PDCCH is detected and the subframe in which the corresponding PUSCH transmission is adjusted, according to the present embodiment.

FIG. 10 and FIG. 11 are diagrams illustrating a first example of a relation between a subframe in which the PDCCH is detected and a subframe in which corresponding PUSCH transmission is adjusted, according to the present embodiment. FIG. 12 and FIG. 13 are diagrams illustrating a second example of a relation between a subframe in which the PDCCH is detected and a subframe in which corresponding PUSCH transmission is adjusted, according to the present embodiment. Here, this PDCCH includes the downlink control information.

The terminal apparatus 1, based on detection of the PDCCH including the downlink control information in the subframe n, adjusts the PUSCH transmission corresponding to this PDCCH in the subframe n+k. A value of this k is given at least in accordance with the UL/DL configuration.

In a case that the parameter pusch-UpPtsAdd, and the parameter pucch-UpPtsAdd are not configured into the terminal apparatus 1, the value of this k may be given at least based on FIG. 10. In FIG. 11, the terminal apparatus 1, based on detection of the PDCCH including the downlink control information in a downlink subframe having a subframe number 3, adjusts the PUSCH transmission corresponding to the PDCCH including this downlink control information in an uplink subframe having a subframe number 7. In a case that the value of this k is given at least based on FIG. 10, the terminal apparatus 1 can adjust the corresponding PUSCH transmission in the special subframe.

In a case that the parameter pusch-UpPtsAdd, and the parameter pucch-UpPtsAdd are not configured into the terminal apparatus 1, the uplink subframe is a subframe available for the PUSCH transmission and the special subframe is not a subframe available for the PUSCH transmission, with respect to the downlink control information transmitted on the PDCCH (an uplink grant).

In a case that the parameter pusch-UpPtsAdd, or the parameter pucch-UpPtsAdd is configured into the terminal apparatus 1, the value of this k may be given at least based on FIG. 12. In FIG. 13, the terminal apparatus 1, based on detection of the PDCCH including the downlink control information in a special subframe having a subframe number 1, adjusts the PUSCH transmission corresponding to the PDCCH including this downlink control information in a special subframe having a subframe number 6. In a case that the value of this k is given at least based on FIG. 11, the terminal apparatus 1 can adjust the corresponding PUSCH transmission in the special subframe.

In a case that the parameter pusch-UpPtsAdd, or the parameter pucch-UpPtsAdd is configured into the terminal apparatus 1, the uplink subframe and a special subframe including the added UpPts are subframes available for the PUSCH transmission, with respect to the downlink control information transmitted on the PDCCH (an uplink grant). Here, a special subframe not including the added UpPTS is not a subframe available for the PUSCH transmission.

That is, the terminal apparatus 1 may select one of a table in FIG. 10 or a table in FIG. 11 based on whether the parameter pusch-UpPtsAdd, or the parameter pucch-UpPtsAdd is configured into the terminal apparatus 1, and decide the value of this k at least based on the selected table. Here, the terminal apparatus 1 may monitor the PDCCH including the downlink control information (uplink grant) based on this selected table.

The random access procedures will be described below.

In the present embodiment, the random access procedure may be performed in the primary cell or the secondary cell. However, only one random access procedure is performed at a point in the time domain. That is, multiple random access procedures are not performed simultaneously.

According to the present embodiment, either of the contention based random access procedure and the non-contention based random access procedure may be performed in the primary cell.

A random access preamble may be transmitted on the PRACH in the primary cell. The terminal apparatus 1 receives information (RRC message) on the random access procedure in the primary cell from the base station apparatus 3. The information on the random access procedure in the primary cell includes information indicating a set of PRACH resources in the primary cell.

In the contention based random access procedure, the terminal apparatus 1 itself selects a random access preamble index at random. In the non-contention based random access procedure, the random access preamble index is selected by the terminal apparatus 1 based on the information received from the base station apparatus 3.

A random access response for the primary cell is transmitted on the PDSCH in the primary cell. The random access response for the primary cell corresponds to the random access preamble transmitted in the primary cell. The PDCCH corresponding to the PDSCH including the random access response (DL-SCH, transport block) includes a Random Access-Radio NeTwork Identifier (RA-RNTI). This PDCCH includes the downlink control information (downlink grant).

The random access response includes an uplink grant field to which an uplink grant is mapped and a Temporary C-RNTI field to which information for indicating a Temporary C-RNTI is mapped. The uplink grant included in the random access response is also referred to as a random access response grant.

In a case that the received random access response includes a random access preamble identifier corresponding to the transmitted random access preamble, and the random access preamble is selected by the terminal apparatus 1 based on the information received from the base station apparatus 3, the terminal apparatus 1 determines that the non-contention based random access procedure has been successfully completed and transmits a transport block on the PUSCH based on the random access response grant.

In a case that the received random access response includes a random access preamble identifier corresponding to the transmitted random access preamble and the terminal apparatus 1 itself selects the random access preamble at random, the terminal apparatus 1 sets the Temporary C-RNTI as the value in the Temporary C-RNTI field and transmits a random access message 3 (transport block) on the PUSCH based on the uplink grant included in the random access response.

The PUSCH corresponding to the uplink grant included in the random access response is transmitted in the serving cell in which the corresponding preamble has been transmitted on the PRACH.

The terminal apparatus 1, after transmitting the message 3, receives a contention resolution. Based on the reception of the contention resolution, the terminal apparatus 1 determines that the contention based random access procedure has been successfully completed.

In a case that the PDCCH including the RA-RNTI is detected in a subframe n, the terminal apparatus 1 transmits the PUSCH, based on the information included in the random access response (random access response grant), in a first available subframe n+k (k≥6) for the PUSCH transmission, or in a next available subframe after the first available subframe n+k for this PUSCH transmission.

In a case that a delay field included in the random access response grant is set to 0, the PUSCH is transmitted in the first available subframe n+k (k≥6) for this PUSCH transmission. In a case that the delay field included in the random access response grant is set to 1, the PUSCH is transmitted in a next available subframe after the first available subframe n+k (k≥6) for this PUSCH transmission.

The subframe available for the PUSCH transmission is based on the UL/DL configuration. The subframe available for the PUSCH transmission is given based on a flowchart in FIG. 14 or a flowchart in FIG. 16. The first flowchart in FIG. 14 and the second flowchart in FIG. 16 may be applied in a case that the parameter pusch-UpPtsAdd, or the parameter pucch-UpPtsAdd is configured for the terminal apparatus 1.

Figure 14:
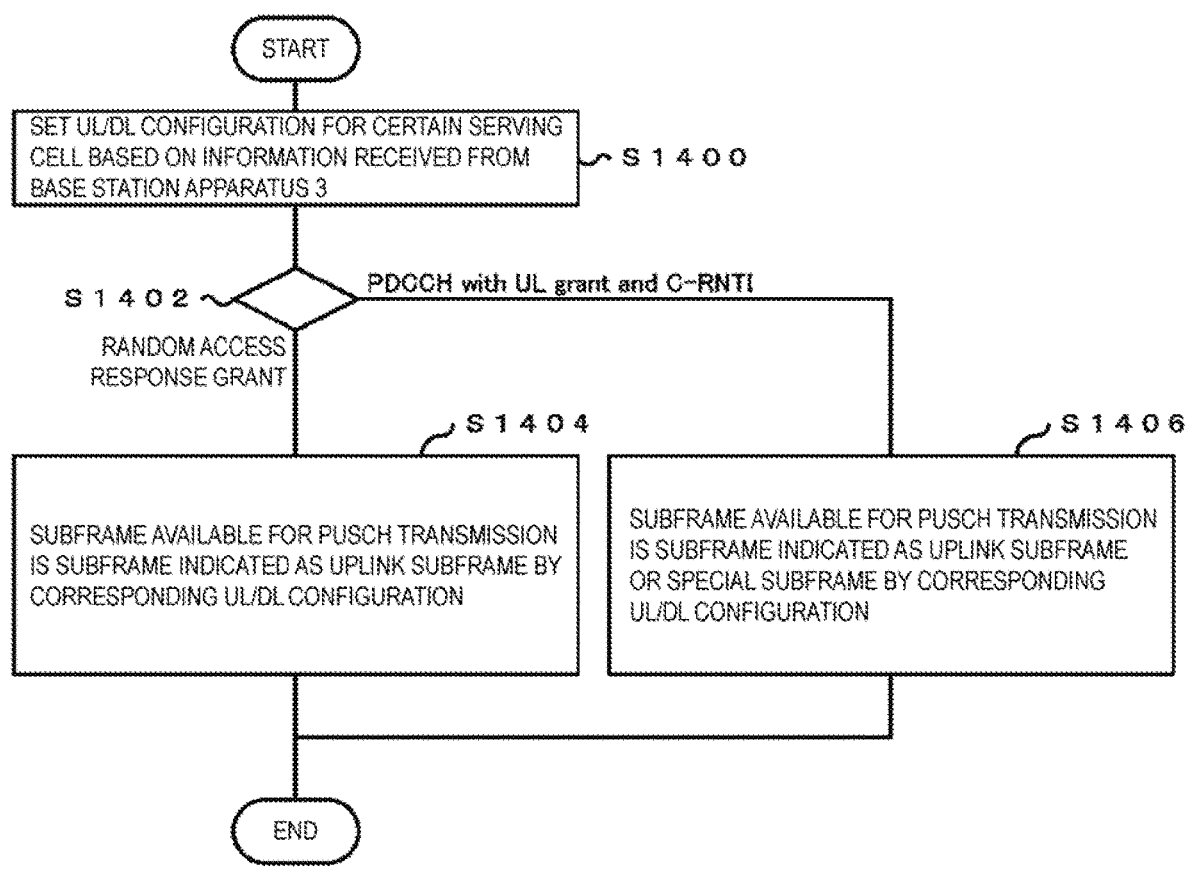
FIG. 14 is a first flowchart for deciding a subframe available for PUSCH transmission, according to the present embodiment.

FIG. 14 is the first flowchart for deciding the subframe available for the PUSCH transmission, according to the present embodiment.

In Step S1400, the terminal apparatus 1 sets a UL/DL configuration for a certain serving cell, based on information received from the base station apparatus 3.

In Step S1402, in a case that a random access response grant is received, or in a case that the PDCCH including the RA-RNTI is detected, the processing proceeds to Step S1404.

In Step S1404, a subframe available for the PUSCH transmission corresponding to the random access response grant is a subframe indicated as an uplink subframe by the UL/DL configuration.

In Step S1402, in a case that the PDCCH including the C-RNTI and an uplink grant is detected, the processing proceeds to Step S1406.

In Step S1406, a subframe available for the PUSCH transmission corresponding to the uplink grant included in the PDCCH is a subframe indicated as the uplink subframe or a special subframe by the UL/DL configuration. Here, this special subframe is a special subframe including an added UpPTS.

That is, the terminal apparatus 1 and the base station apparatus 3 may decide the available subframe for the corresponding PUSCH transmission, based on which of the uplink grant included in PDCCH and the random access response grant the PUSCH transmission corresponds to.

Figure 15:
FIG. 15 is a diagram illustrating one example of a subframe available for PUSCH transmission corresponding to a random access response grant, according to the present embodiment.

FIG. 15 is a diagram illustrating one example of subframes available for PUSCH transmission corresponding to a random access response grant, according to the present embodiment. SFN denotes a radio frame number. In FIG. 15, the subframes available for the PUSCH transmission corresponding to the random access response grant are subframes having subframe numbers 2 and 7. In FIG. 15, in a subframe 0 of SFN0, the PDCCH including the RA-RNTI and the random access response grant (1500) are received. In FIG. 15, a first available subframe n+k (k≥6) (1501) for corresponding PUSCH transmission is a subframe 7 of SFN0. In FIG. 15, a next available subframe after the first available subframe n+k (k≥6) for the corresponding PUSCH transmission is a subframe 2 of SFN1.

Figure 16:
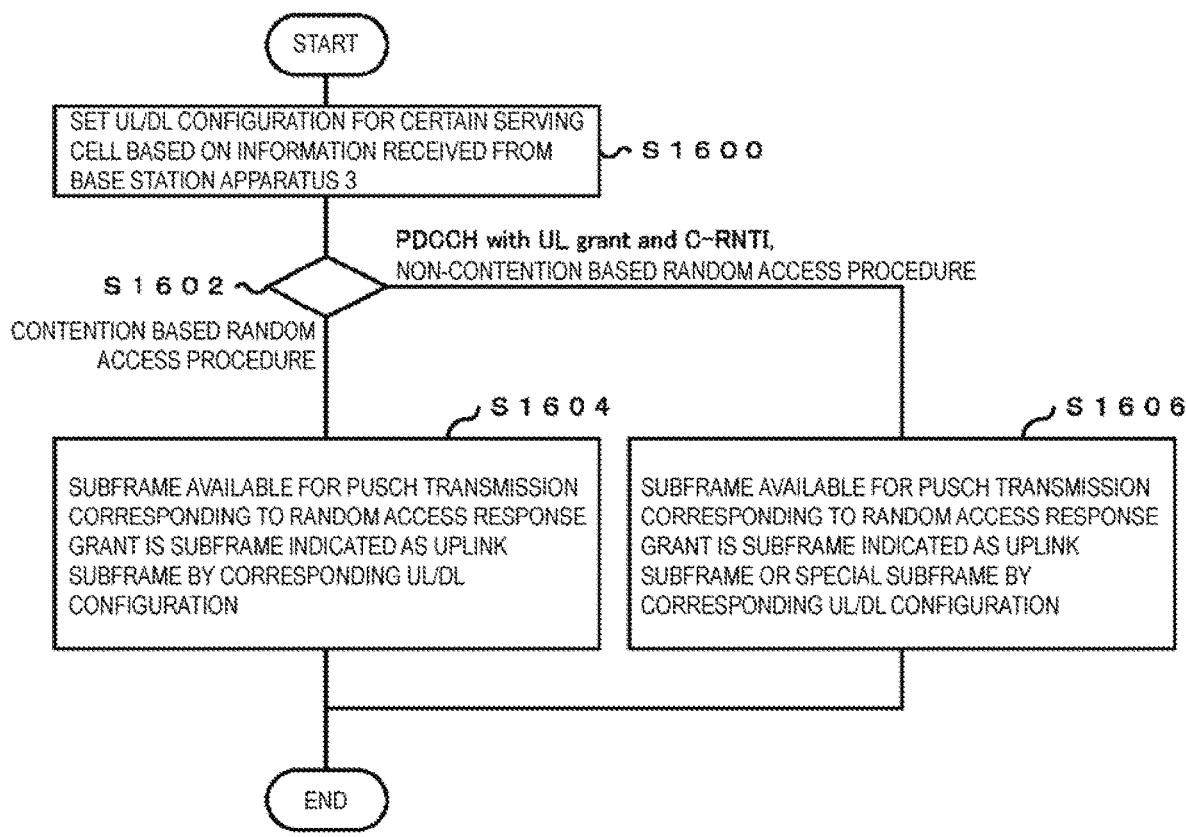
FIG. 16 is a second flowchart for deciding a subframe available for PUSCH transmission, according to the present embodiment.

FIG. 16 is the second flowchart for deciding a subframe available for PUSCH transmission, according to the present embodiment.

In Step S1600, the terminal apparatus 1 sets a UL/DL configuration for a certain serving cell, based on information received from the base station apparatus 3.

In Step S1602, in a case that a random access response grant associated with a contention based random access procedure is received, the processing proceeds to Step S1604.

In Step S1604, a subframe available for corresponding PUSCH transmission is a subframe indicated as an uplink subframe by the UL/DL configuration.

In Step S1602, in a case that the PDCCH including the C-RNTI and an uplink grant is detected, or in a case that a random access response grant associated with a non-contention based random access procedure is received, the processing proceeds to Step S1606.

In Step S1606, a subframe available for corresponding PUSCH transmission is a subframe indicated as an uplink subframe or a special subframe by the UL/DL configuration. Here, this special subframe is a special subframe including an added UpPTS.

That is, the terminal apparatus 1 and the base station apparatus 3 may decide the available subframe for the corresponding PUSCH transmission, based on which of the random access response grant associated with the contention based random access procedure and the random access response grant associated with the non-contention based random access procedure the PUSCH transmission corresponds to.

That is, the terminal apparatus 1 and the base station apparatus 3 may decide the available subframe for the corresponding PUSCH transmission, based on which of the contention based random access procedure and the non-contention based random access procedure the random access response grant corresponds to.

FIGS. 17I and 17II are diagrams illustrating one example of a subframe available for PUSCH transmission corresponding to a random access response grant, according to the present embodiment. SFN denotes a radio frame number. FIG. 17I is an example associated with a contention based random access procedure. FIG. 17II is an example associated with a non-contention based random access procedure.

In FIG. 17I, subframes available for PUSCH transmission corresponding to a random access response grant associated with the contention based random access procedure are subframes having subframe numbers 2 and 7. In FIG. 17I, in a subframe 0 of SFN0, the random access response grant (1700) associated with the contention based random access procedure is received. In FIG. 17I, a first available subframe n+k (k≥6) (1701) for corresponding PUSCH transmission is a subframe 7 of SFN0. In FIG. 17I, a next available subframe after the first available subframe n+k (k≥6) for the corresponding PUSCH transmission is a subframe 2 of SFN1.

In FIG. 17II, subframes available for PUSCH transmission corresponding to a random access response grant associated with the non-contention based random access procedure are subframes having subframe numbers 1, 2, 6 and 7. In FIG. 17II, in a subframe 0 of SFN0, the random access response grant (1703) associated with the non-contention based random access procedure is received. In FIG. 17II, a first available subframe n+k (k≥6) (1704) for corresponding PUSCH transmission is a subframe 6 of SFN0. In FIG. 17II, a next available subframe after the first available subframe n+k (k≥6) for the corresponding PUSCH transmission is a subframe 7 of SFN0.

Structures of apparatuses according to the present embodiment will be described below.

Figure 18:
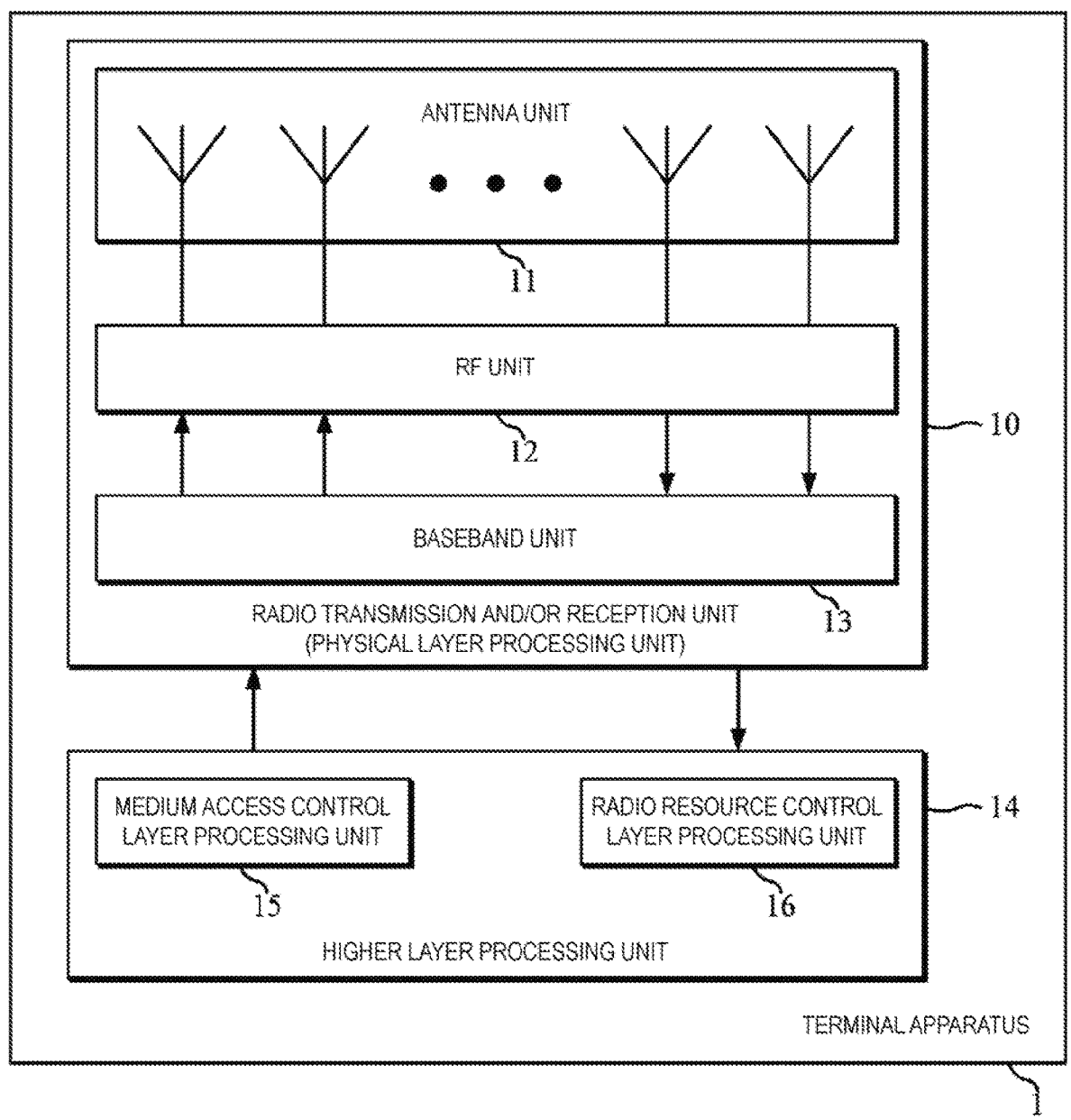
FIG. 18 is a schematic block diagram illustrating a constitution of a terminal apparatus 1, according to the present embodiment.

FIG. 18 is a schematic block diagram illustrating a constitution of the terminal apparatus 1, according to the present embodiment. As illustrated, the terminal apparatus 1 is configured to include a radio transmission and/or reception unit 10 and a higher layer processing unit 14. The radio transmission and/or reception unit 10 is configured to include an antenna unit 11, a Radio Frequency (RF) unit 12, and a baseband unit 13. The higher layer processing unit 14 is configured to include a medium access control layer processing unit 15 and a radio resource control layer processing unit 16. The radio transmission and/or reception unit 10 is also referred to as a transmitter, a receiver or a physical layer processing unit.

The higher layer processing unit 14 outputs uplink data (transport block) generated by a user operation or the like, to the radio transmission and/or reception unit 10. The higher layer processing unit 14 performs processing of the Medium Access Control (MAC) layer, the Packet Data Convergence Protocol (PDCP) layer, the Radio Link Control (RLC) layer, and the Radio Resource Control (RRC) layer.

The medium access control layer processing unit 15 included in the higher layer processing unit 14 performs processing of the Medium Access Control layer. The medium access control layer processing unit 15 controls transmission of a scheduling request, based on various types of configuration information/parameters managed by the radio resource control layer processing unit 16.

The radio resource control layer processing unit 16 included in the higher layer processing unit 14 performs processing of the Radio Resource Control layer. The radio resource control layer processing unit 16 manages the various types of configuration information/parameters of the terminal apparatus 1. The radio resource control layer processing unit 16 sets the various types of configuration information/parameters, based on higher layer signaling received from the base station apparatus 3. That is, the radio resource control layer processing unit 16 sets the various types of configuration information/parameters, based on information indicating the various types of configuration information/parameters received from the base station apparatus 3.

The radio transmission and/or reception unit 10 performs processing of the physical layer, such as modulation, demodulation, coding, and decoding. The radio transmission and/or reception unit 10 demultiplexes, demodulates, and decodes a signal received from the base station apparatus 3, and outputs the information resulting from the decoding to the higher layer processing unit 14. The radio transmission and/or reception unit 10 modulates and codes data to generate a transmit signal, and transmits the transmit signal to the base station apparatus 3.

The RF unit 12 converts (down-converts) a signal received via the antenna unit 11 into a baseband signal by orthogonal demodulation and removes unnecessary frequency components. The RF unit 12 outputs the processed analog signal to the baseband unit.

The baseband unit 13 converts the analog signal input from the RF unit 12 into a digital signal. The baseband unit 13 removes a portion corresponding to a Cyclic Prefix (CP) from the digital signal resulting from the conversion, performs Fast Fourier Transform (FFT) on the signal from which the CP has been removed, and extracts a signal in the frequency domain.

The baseband unit 13 performs Inverse Fast Fourier Transform (IFFT) on data, generates an SC-FDMA symbol, attaches a CP to the generated SC-FDMA symbol, generates a baseband digital signal, and converts the baseband digital signal into an analog signal. The baseband unit 13 outputs the analog signal resulting from the conversion, to the RF unit 12.

The RF unit 12 removes unnecessary frequency components from the analog signal input from the baseband unit 13 by using a low-pass filter, up-converts the analog signal into a signal of a carrier frequency, and transmits the final result via the antenna unit 11. Furthermore, the RF unit 12 amplifies power. Furthermore, the RF unit 12 may have a function of controlling transmit power. The RF unit 12 is also referred to as a transmit power controller.

Figure 19:
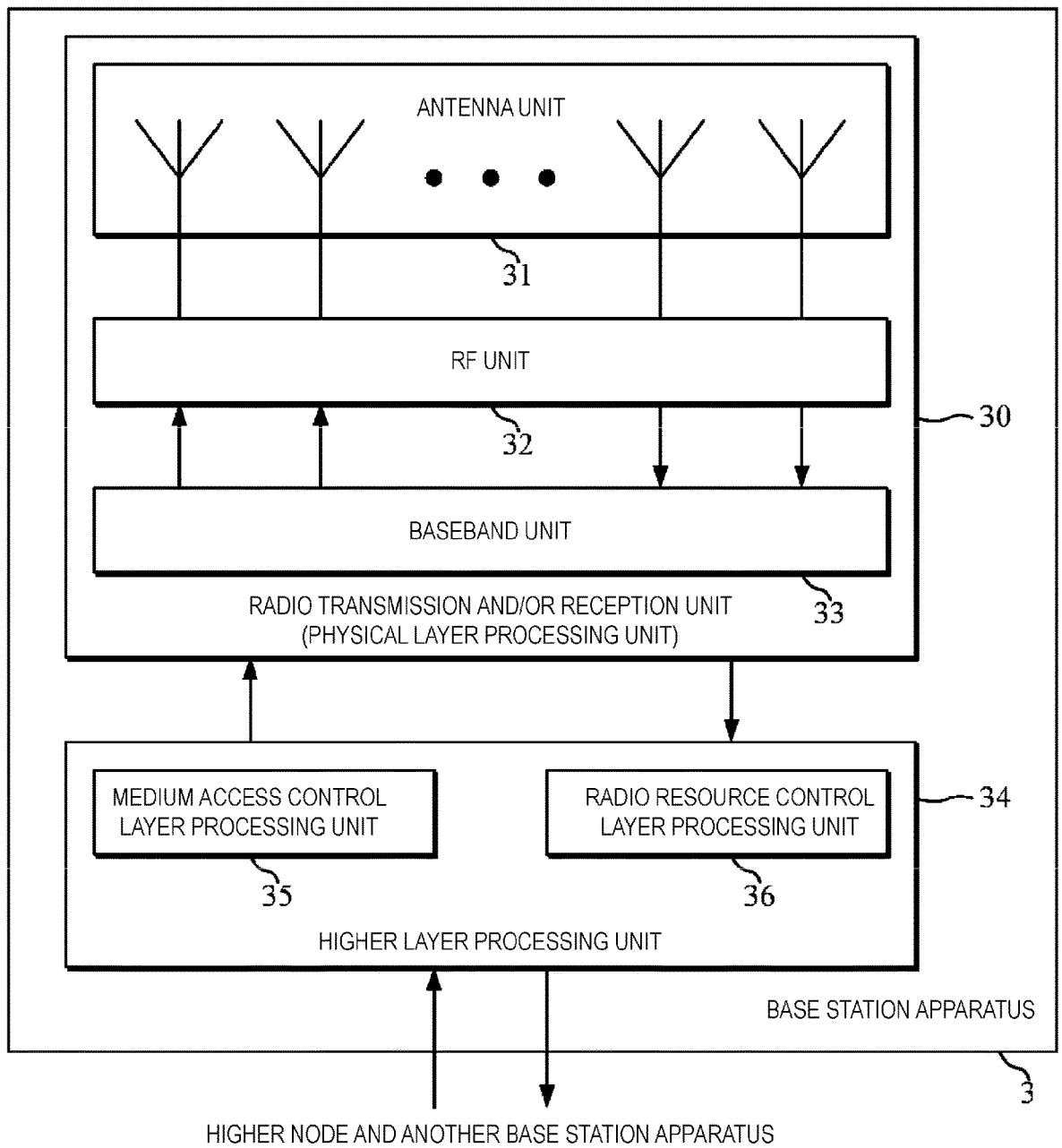
FIG. 19 is a schematic block diagram illustrating a constitution of a base station apparatus 3, according to the present embodiment.

FIG. 19 is a schematic block diagram illustrating a constitution of a base station apparatus 3, according to the present embodiment. As illustrated, the base station apparatus 3 is configured to include a radio transmission and/or reception unit 30 and a higher layer processing unit 34. The radio transmission and/or reception unit 30 is configured to include an antenna unit 31, an RF unit 32, and a baseband unit 33. The higher layer processing unit 34 is configured to include a medium access control layer processing unit 35 and a radio resource control layer processing unit 36. The radio transmission and/or reception unit 30 is also referred to as a transmitter, a receiver or a physical layer processing unit.

The higher layer processing unit 34 performs processing of the Medium Access Control (MAC) layer, the Packet Data Convergence Protocol (PDCP) layer, the Radio Link Control (RLC) layer, and the Radio Resource Control (RRC) layer.

The medium access control layer processing unit 35 included in the higher layer processing unit 34 performs processing of the Medium Access Control layer. The medium access control layer processing unit 35 performs processing associated with a scheduling request, based on various types of configuration information/parameters managed by the radio resource control layer processing unit 36.

The radio resource control layer processing unit 36 included in the higher layer processing unit 34 performs processing of the Radio Resource Control layer. The radio resource control layer processing unit 36 generates, or acquires from a higher node, downlink data (transport block) arranged on a physical downlink shared channel, system information, an RRC message, a MAC Control Element (CE), and the like, and outputs the generated or acquired data to the radio transmission and/or reception unit 30. Furthermore, the radio resource control layer processing unit 36 manages various types of configuration information/parameters for each of the terminal apparatuses 1. The radio resource control layer processing unit 36 may set various types of configuration information/parameters for each of the terminal apparatuses 1 via the higher layer signaling. In other words, the radio resource control layer processing unit 36 transmits/broadcasts information indicating various types of configuration information/parameters.

The functionality of the radio transmission and/or reception unit 30 is similar to that of the radio transmission and/or reception unit 10, and hence description thereof is omitted.

Each of the units having the reference signs 10 to 16 included in the terminal apparatus 1 may be configured as a circuit. Each of the units having the reference signs 30 to 36 included in the base station apparatus 3 may be configured as a circuit.

Various aspects of the terminal apparatus 1 and the base station apparatus 3 according to the present embodiment will be described below.

(1) A first aspect according to the present embodiment is a terminal apparatus that includes a receiver 10 configured to receive information for indicating a configuration of an added Uplink Pilot Time Slot (UpPTS), and a transmitter 10 configured to transmit a Sounding Reference Signal (SRS) and a Physical Uplink Shared CHannel (PUSCH), in which the transmitter 10 transmits capability information used for indicating (i) whether a terminal apparatus supports the SRS transmission in the added UpPTS included in a special subframe, and (ii) whether the terminal apparatus supports the PUSCH transmission in the added UpPTS included in the special subframe.

(2) A second aspect according to the present embodiment is a base station apparatus that includes a transmitter 30 configured to transmit information for indicating a configuration of an added Uplink Pilot Time Slot (UpPTS), and a receiver 30 configured to receive a Sounding Reference Signal (SRS) and a Physical Uplink Shared CHannel (PUSCH), in which the receiver 30 receives capability information used for indicating (i) whether a terminal apparatus supports the SRS transmission in the added UpPTS included in a special subframe, and (ii) whether the terminal apparatus supports the PUSCH transmission in the added UpPTS included in the special subframe.

(3) A third aspect of the present embodiment is a terminal apparatus that includes a receiver 10 configured to receive a random access response including a random access response grant and downlink control information, and a transmitter 10 configured to transmit a Physical Uplink Shared CHannel (PUSCH) in an added Uplink Pilot Time Slot (UpPTS) included in a special subframe based on the downlink control information, in which a subframe available for PUSCH transmission corresponding to the random access response grant is an uplink subframe other than the special subframe including the added UpPTS.

(4) A fourth aspect of the present embodiment is a terminal apparatus that includes a receiver 10 configured to receive a random access response including a random access response grant, and a transmitter 10 configured to transmit a Physical Uplink Shared CHannel (PUSCH) based on the random access response grant, in which a subframe available for PUSCH transmission corresponding to the random access response grant associated with a non-contention based random access procedure at least includes a special subframe including an added Uplink Pilot Time Slot (UpPTS).

(5) In the fourth aspect of the present embodiment, a subframe available for PUSCH transmission corresponding to the random access response grant associated with a contention based random access procedure does not include a special subframe including the added UpPTS.

(6) In the third aspect of the present embodiment and in the fourth aspect of the present embodiment, the transmitter 10, in a case that a Physical Downlink Control CHannel (PDCCH) associated with a Random Access-Radio Network Temporary Identifier (RA-RNTI) is detected in a subframe n, and a corresponding transport block includes a random access response to a transmitted random access preamble, in a first available subframe n+k (k≥6) for the PUSCH transmission, or in a next available subframe after the first available subframe n+k for the PUSCH transmission, performs the PUSCH transmission.

(7) In the third aspect of the present embodiment and in the fourth aspect of the present embodiment, the receiver 10 receives information for indicating a configuration of the added UpPTS.

(8) A fifth aspect of the present embodiment is a base station apparatus that includes a transmitter 30 configured to transmit a random access response including a random access response grant and downlink control information, and a receiver 30 configured to receive a Physical Uplink Shared CHannel (PUSCH) in an added Uplink Pilot Time Slot (UpPTS) included in a special subframe based on the downlink control information, in which a subframe available for PUSCH transmission corresponding to the random access response grant is an uplink subframe other than the special subframe including the added UpPTS.

(9) A sixth aspect of the present embodiment is a base station apparatus that includes a transmitter 30 configured to transmit a random access response including a random access response grant, and a receiver 30 configured to receive a Physical Uplink Shared CHannel (PUSCH) based on the random access response grant, in which a subframe available for PUSCH transmission corresponding to the random access response grant associated with a non-contention based random access procedure at least includes a special subframe including an added Uplink Pilot Time Slot (UpPTS).

(10) In the fifth aspect of the present embodiment and in the sixth aspect of the present embodiment, the receiver 30, in a case that Physical Downlink Control CHannel (PDCCH) associated with a Random Access-Radio Network Temporary Identifier (RA-RNTI) is transmitted in a subframe n, and a corresponding transport block includes a random access response to a received random access preamble, in a first available subframe n+k (k≥6) for the PUSCH transmission, or in a next available subframe after the first available subframe n+k for the PUSCH transmission, receives the PUSCH transmission.

(11) In the fifth aspect of the present embodiment and in the sixth aspect of the present embodiment, the transmitter 30 transmits information for indicating a configuration of the added UpPTS.

Accordingly, the terminal apparatus and the base station apparatus can efficiently communicate with each other by using an uplink signal.

A program running on each of the base station apparatus 3 and the terminal apparatus 1 according to the present invention may serve as a program that controls a Central Processing Unit (CPU) and the like (a program for causing a computer to operate) in such a manner as to enable the functionalities according to the above-described embodiment of the present invention. The information handled in these apparatuses is temporarily stored in a Random Access Memory (RAM) while being processed. Thereafter, the information is stored in various types of Read Only Memories (ROM) such as a flash ROM and a Hard Disk Drive (HDD), and when necessary, is read by the CPU to be modified or rewritten.

Moreover, the terminal apparatus 1 and the base station apparatus 3 according to the above-described embodiment may be partially achieved by a computer. In this case, this configuration may be enabled by recording a program for enabling such control functions on a computer-readable recording medium and causing a computer system to read and perform the program recorded on the recording medium.

Note that it is assumed that the "computer system" refers to a computer system built into the terminal apparatus 1 or the base station apparatus 3, and the computer system includes an OS and hardware components such as a peripheral device. Furthermore, the "computer-readable recording medium" refers to a portable medium such as a flexible disk, a magneto-optical disk, a ROM, and a CD-ROM, and a storage device such as a hard disk built into the computer system.

Moreover, the "computer-readable recording medium" may include a medium that dynamically retains the program for a short period of time, such as a communication line that is used to transmit the program over a network such as the Internet or over a communication line such as a telephone line, and a medium that retains, in that case, the program for a fixed period of time, such as a volatile memory within the computer system which functions as a server or a client. Furthermore, the program may be configured to enable some of the functions described above, and also may be configured to be capable of enabling the functions described above in combination with a program already recorded in the computer system.

Furthermore, the base station apparatus 3 according to the above-described embodiment is achieved as an aggregation (an apparatus group) constituted of multiple apparatuses. Each of the apparatuses constituting such an apparatus group may include some or all portions of each function or each functional block of the base station apparatus 3 according to the above-described embodiment. The apparatus group may include a series of functions or functional blocks of the base station apparatus 3. Furthermore, the terminal apparatus 1 according to the above-described embodiment can also communicate with the base station apparatus as the aggregation.

Furthermore, the base station apparatus 3 according to the above-described embodiment may serve as an Evolved Universal Terrestrial Radio Access Network (EUTRAN).

Furthermore, the base station apparatus 3 according to the above-described embodiment may have some or all portions of the functions of a node higher than an eNodeB.

Furthermore, some or all portions of each of the terminal apparatus 1 and the base station apparatus 3 according to the above-described embodiment may be achieved as an LSI which is a typical integrated circuit or may be achieved as a chip set. The functional blocks of each of the terminal apparatus 1 and the base station apparatus 3 may be individually achieved as a chip, or some or all of the functional blocks may be integrated into a chip. Furthermore, a circuit integration technique is not limited to the LSI, and may be achieved with a dedicated circuit or a general-purpose processor. Furthermore, in a case where with advances in semiconductor technology, a circuit integration technology with which an LSI is replaced appears, it is also possible to use an integrated circuit based on the technology.

Furthermore, according to the above-described embodiment, the terminal apparatus is described as one example of a communication device, but the present invention is not limited to this, and can be applied to a fixed-type or a stationary-type electronic apparatus installed indoors or outdoors, for example, a terminal apparatus or a communication device, such as an audio-video (AV) apparatus, a kitchen apparatus, a cleaning or washing machine, an air-conditioning apparatus, office equipment, a vending machine, an automobile, a bicycle, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which a constituent element that achieves the same effect is substituted for the one that is described in the embodiments is also included in the technical scope of the present invention.

CROSS-REFERENCE OF RELATED APPLICATION

This application claims the benefit of priority to JP 2016-067455 filed on Mar. 30, 2016, which is incorporated herein by reference in its entirety.

REFERENCE SIGNS LIST 1 (1A, 1B, 1C) Terminal apparatus
3 Base station apparatus
10 Radio transmission and/or reception unit
11 Antenna unit
12 RF unit
13 Baseband unit
14 Higher layer processing unit
15 Medium access control layer processing unit
16 Radio resource control layer processing unit
30 Radio transmission and/or reception unit
31 Antenna unit
32 RF unit
33 Baseband unit
34 Higher layer processing unit
35 Medium access control layer processing unit
36 Radio resource control layer processing unit

The invention claimed is:

1. A terminal apparatus which communicates with a base station apparatus using a serving cell, comprising:
   determining circuitry configured to determine a Time Division Duplex (TDD) uplink/downlink (UL/DL) configuration of the serving cell,
   a receiver configured to receive a Physical Downlink Control Channel (PDCCH) including Downlink Control Information (DCI) in subframe n; and
   a transmitter configured to transmit a Physical Uplink Shared Channel (PUSCH) in subframe n+k based on a detection of the PDCCH, wherein
   k is determined based on a first table in a case that the terminal apparatus is not configured with a first parameter of an RRC layer, wherein the first parameter indicates a number of Single Carrier-Frequency Division Multiple Access (SC-FDMA) symbols configured for a transmission of the PUSCH in an Uplink Pilot Time Slot (UpPTS) of a special subframe,
   k is determined based on a second table which is different from the first table in a case that the terminal apparatus is configured with the parameter, and
   the first table and the second table independently indicate k corresponding to (a) the TDD UL/DL configuration and (b) n.

2. The terminal apparatus of claim 1, wherein
   the transmitter is further configured to transmit a Sounding Reference Signal (SRS) and capability information, wherein
   the capability information includes a first indication indicating whether or not the terminal apparatus supports a transmission of the SRS in SC-FDMA symbols of the UpPTS, wherein a number of the SC-FDMA symbols is indicated by a second parameter of the RRC layer, and
   the capability information includes a second indication indicating whether or not the terminal apparatus supports a transmission of the PUSCH in SC-FDMA symbols of the UpPTS, wherein a number of the SC-FDMA symbols is indicated by the first parameter of the RRC layer.

3. A method performed by a terminal apparatus which communicates with a base station apparatus using a serving cell, comprising:
   determining a Time Division Duplex (TDD) uplink/downlink (UL/DL) configuration of the serving cell,
   receiving a Physical Downlink Control Channel (PDCCH) including Downlink Control Information (DCI) in subframe n; and
   transmitting a Physical Uplink Shared Channel (PUSCH) in subframe n+k based on a detection of the PDCCH, wherein
   k is determined based on a first table in a case that the terminal apparatus is not configured with a first parameter of an RRC layer, wherein the first parameter indicates a number of Single Carrier-Frequency Division Multiple Access (SC-FDMA) symbols configured for a transmission of the PUSCH in an Uplink Pilot Time Slot (UpPTS) of a special subframe,
   k is determined based on a second table which is different from the first table in a case that the terminal apparatus is configured with the parameter, and
   the first table and the second table independently indicate k corresponding to (a) the TDD UL/DL configuration and (b) n.

4. A base station apparatus which communicates with a terminal apparatus using a serving cell, comprising:

determining circuitry configured to determine a Time Division Duplex (TDD) uplink/downlink (UL/DL) configuration of the serving cell, a transmitter configured to transmit, to the terminal apparatus, a Physical Downlink Control Channel (PDCCH) including Downlink Control Information (DCI) in subframe n; and a receiver configured to receive a Physical Uplink Shared Channel (PUSCH) in subframe n+k, wherein the PUSCH is transmitted by the terminal apparatus based on a detection of the PDCCH, wherein k is determined based on a first table in a case that the terminal apparatus is not configured with a first parameter of an RRC layer, wherein the first parameter indicates a number of Single Carrier-Frequency Division Multiple Access (SC-FDMA) symbols configured for a transmission of the PUSCH in an Uplink Pilot Time Slot (UpPTS) of a special subframe, k is determined based on a second table which is different from the first table in a case that the terminal apparatus is configured with the parameter, and the first table and the second table independently indicate k corresponding to (a) the TDD UL/DL configuration and (b) n.

5. The base station apparatus of claim 4, wherein the receiver is further configured to receive a Sounding Reference Signal (SRS) and capability information, wherein the capability information includes a first indication indicating whether or not the terminal apparatus supports a transmission of the SRS in SC-FDMA symbols of the UpPTS, wherein a number of the SC-FDMA symbols is indicated by a second parameter of the RRC layer, and the capability information includes a second indication indicating whether or not the terminal apparatus supports a transmission of the PUSCH in SC-FDMA symbols of the UpPTS, wherein a number of the SC-FDMA symbols is indicated by the first parameter of the RRC layer.

6. A method performed by a base station apparatus which communicates with a terminal apparatus using a serving cell, comprising:

determining a Time Division Duplex (TDD) uplink/downlink (UL/DL) configuration of the serving cell, transmitting, to the terminal apparatus, a Physical Downlink Control Channel (PDCCH) including Downlink Control Information (DCI) in subframe n; and receiving a Physical Uplink Shared Channel (PUSCH) in subframe n+k, wherein the PUSCH is transmitted by the terminal apparatus based on a detection of the PDCCH, wherein k is determined based on a first table in a case that the terminal apparatus is not configured with a first parameter of an RRC layer, wherein the first parameter indicates a number of Single Carrier-Frequency Division Multiple Access (SC-FDMA) symbols configured for a transmission of the PUSCH in an Uplink Pilot Time Slot (UpPTS) of a special subframe, k is determined based on a second table which is different from the first table in a case that the terminal apparatus is configured with the parameter, and the first table and the second table independently indicate k corresponding to (a) the TDD UL/DL configuration and (b) n.

* * * * *